July 28, 1942.  H. T. AVERY  2,291,134
CALCULATING MACHINE
Original Filed Dec. 18, 1933   17 Sheets-Sheet 1

INVENTOR
HAROLD T. AVERY
BY
ATTORNEY

July 28, 1942.  H. T. AVERY  2,291,134
CALCULATING MACHINE
Original Filed Dec. 18, 1933    17 Sheets-Sheet 2
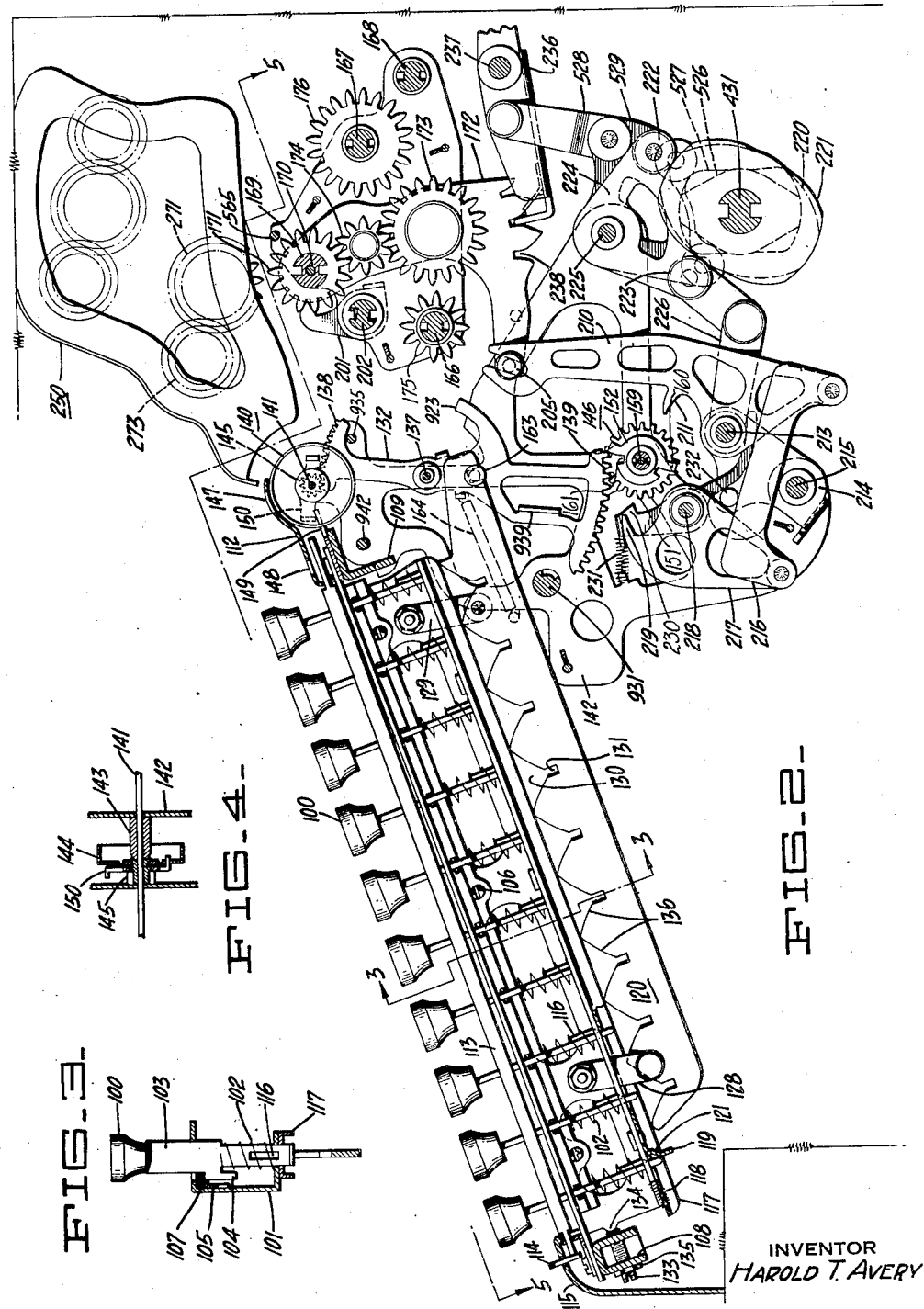
INVENTOR
HAROLD T. AVERY
ATTORNEY July 28, 1942.  H. T. AVERY  2,291,134
CALCULATING MACHINE
Original Filed Dec. 18, 1933   17 Sheets-Sheet 3

INVENTOR
HAROLD T. AVERY
BY
ATTORNEY

July 28, 1942.  H. T. AVERY  2,291,134
CALCULATING MACHINE
Original Filed Dec. 18, 1933   17 Sheets-Sheet 4
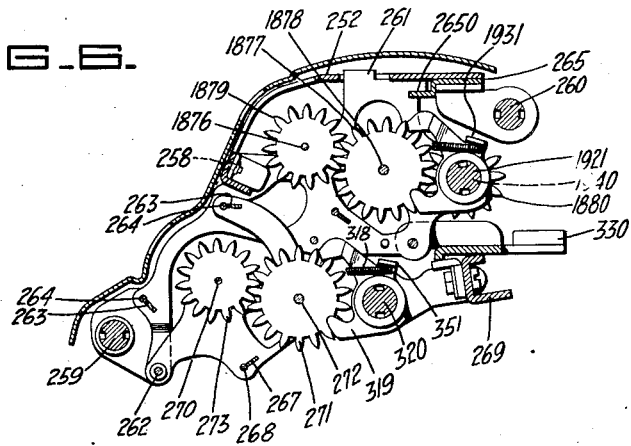
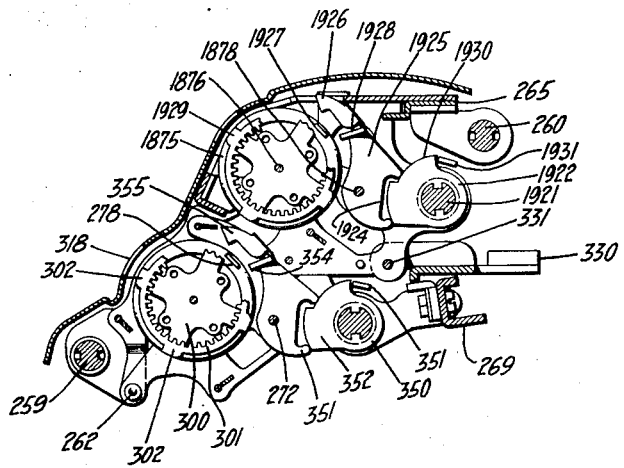
INVENTOR
HAROLD T. AVERY
BY
ATTORNEY July 28, 1942.  H. T. AVERY  2,291,134
CALCULATING MACHINE
Original Filed Dec. 18, 1933  17 Sheets-Sheet 5
FIG_8_
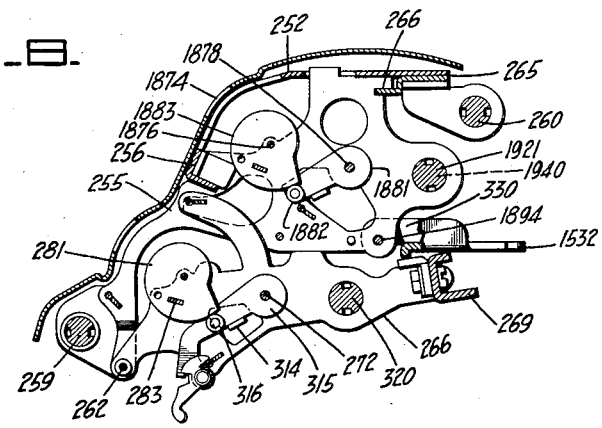
FIG_9_
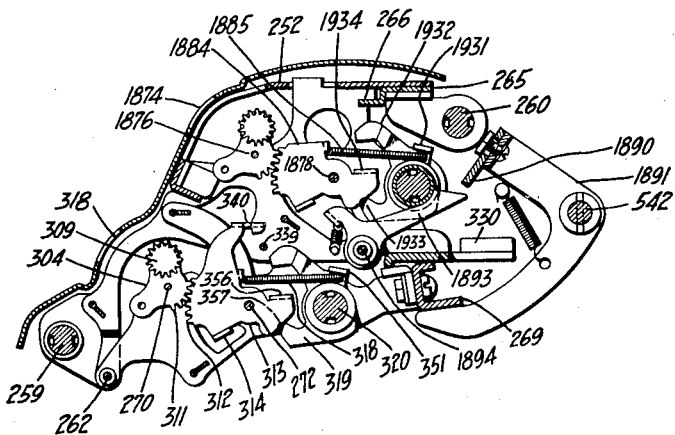
INVENTOR
HAROLD T. AVERY
BY
ATTORNEY July 28, 1942.  H. T. AVERY  2,291,134
CALCULATING MACHINE
Original Filed Dec. 18, 1933  17 Sheets-Sheet 6
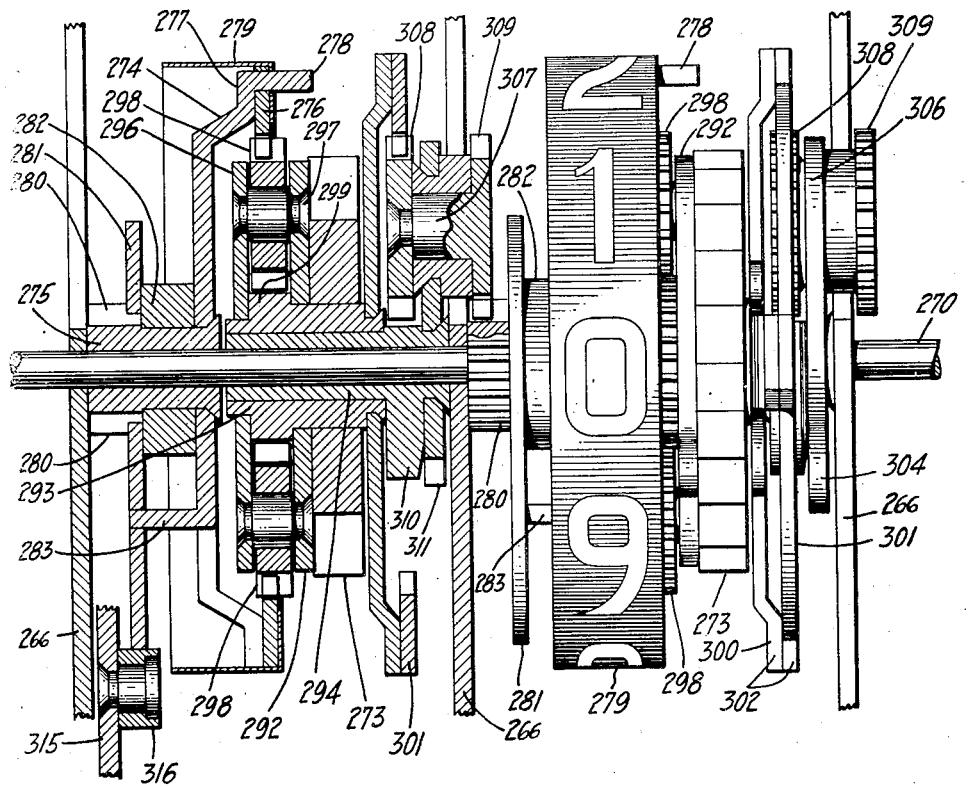
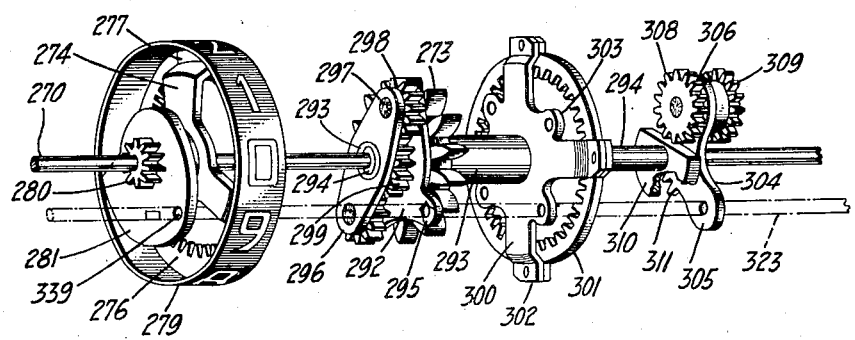
INVENTOR
HAROLD T. AVERY
BY
ATTORNEY July 28, 1942.   H. T. AVERY   2,291,134
CALCULATING MACHINE
Original Filed Dec. 18, 1933   17 Sheets-Sheet 7
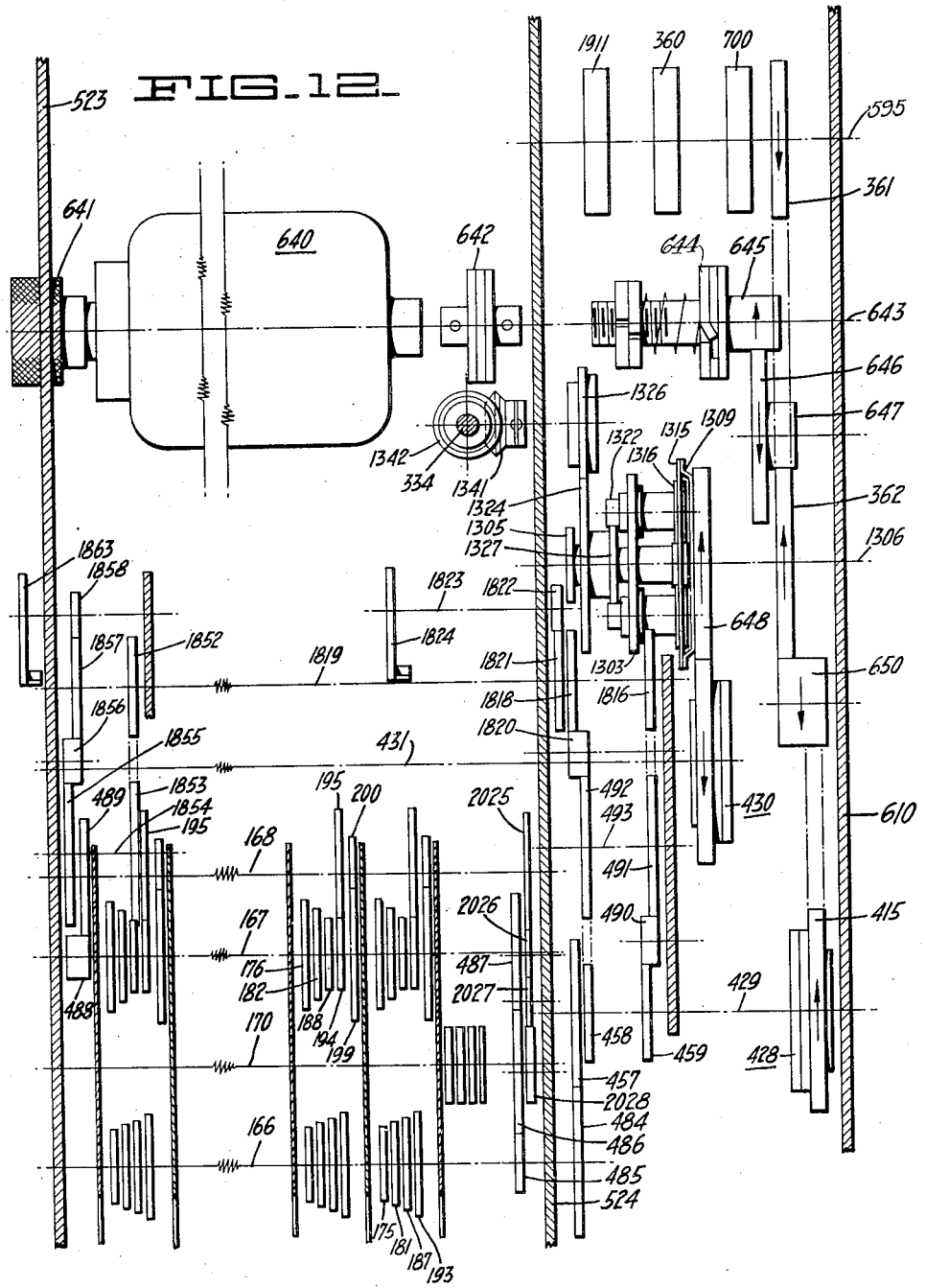
INVENTOR
HAROLD T. AVERY
BY
ATTORNEY July 28, 1942.        H. T. AVERY         2,291,134
                   CALCULATING MACHINE
          Original Filed Dec. 18, 1933    17 Sheets-Sheet 8
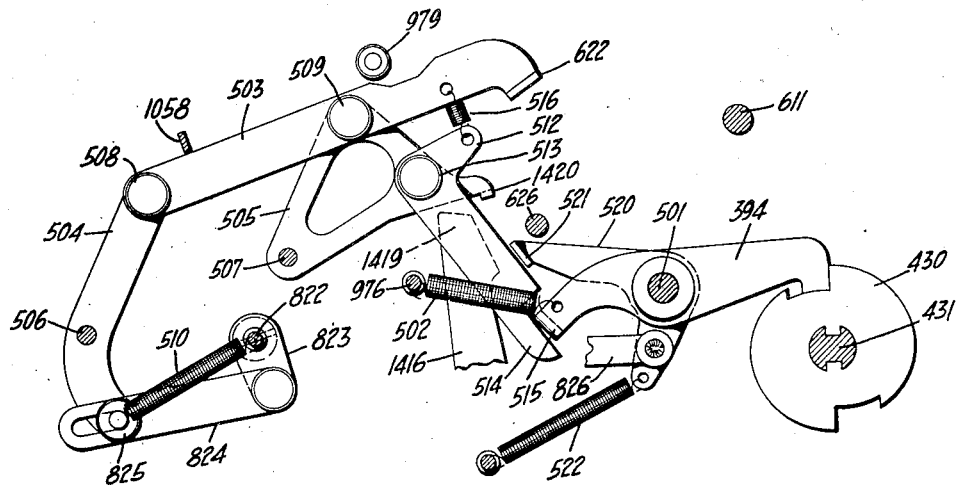
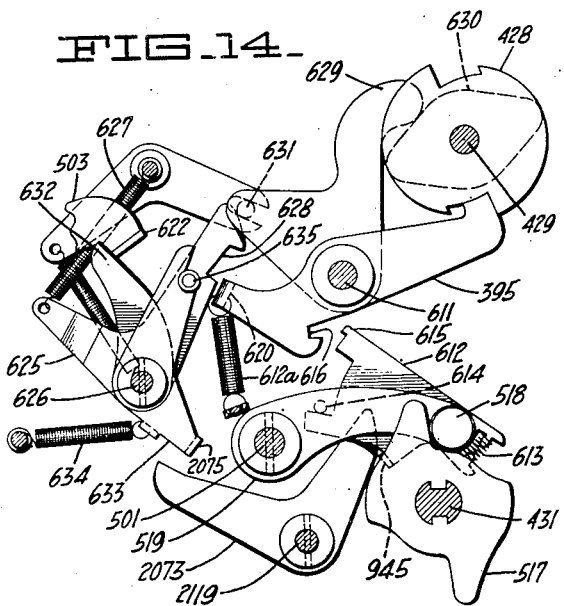
INVENTOR
HAROLD T. AVERY
BY
ATTORNEY July 28, 1942.  H. T. AVERY  2,291,134
CALCULATING MACHINE
Original Filed Dec. 18, 1933   17 Sheets-Sheet 9

INVENTOR
HAROLD T. AVERY
BY
ATTORNEY

July 28, 1942.   H. T. AVERY   2,291,134
CALCULATING MACHINE
Original Filed Dec. 18, 1933   17 Sheets-Sheet 10
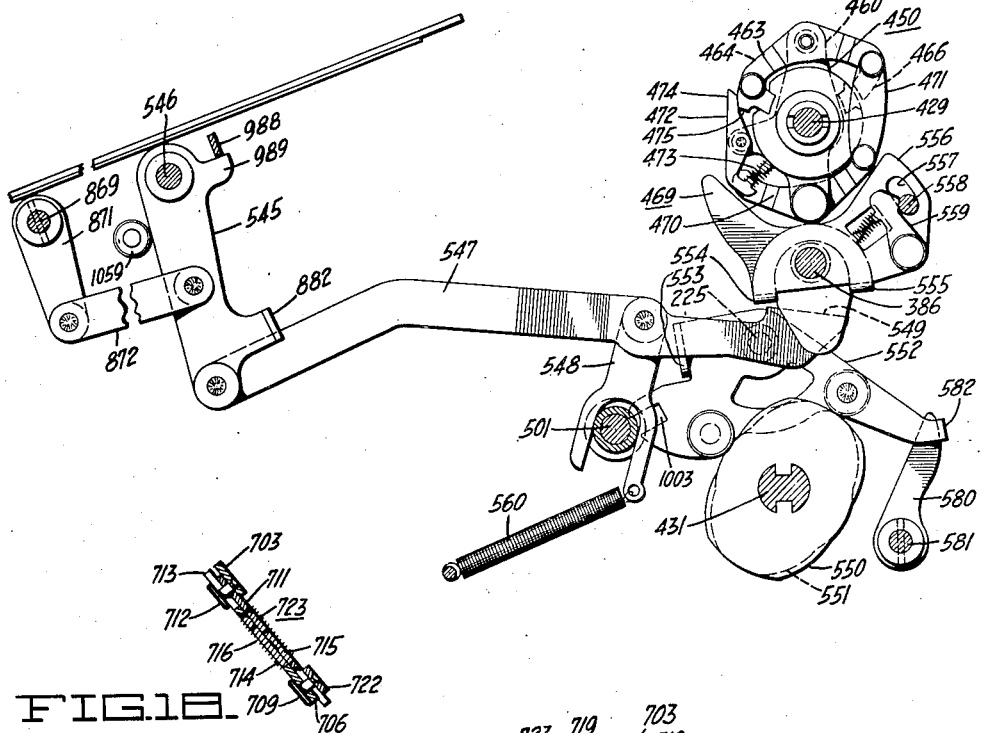
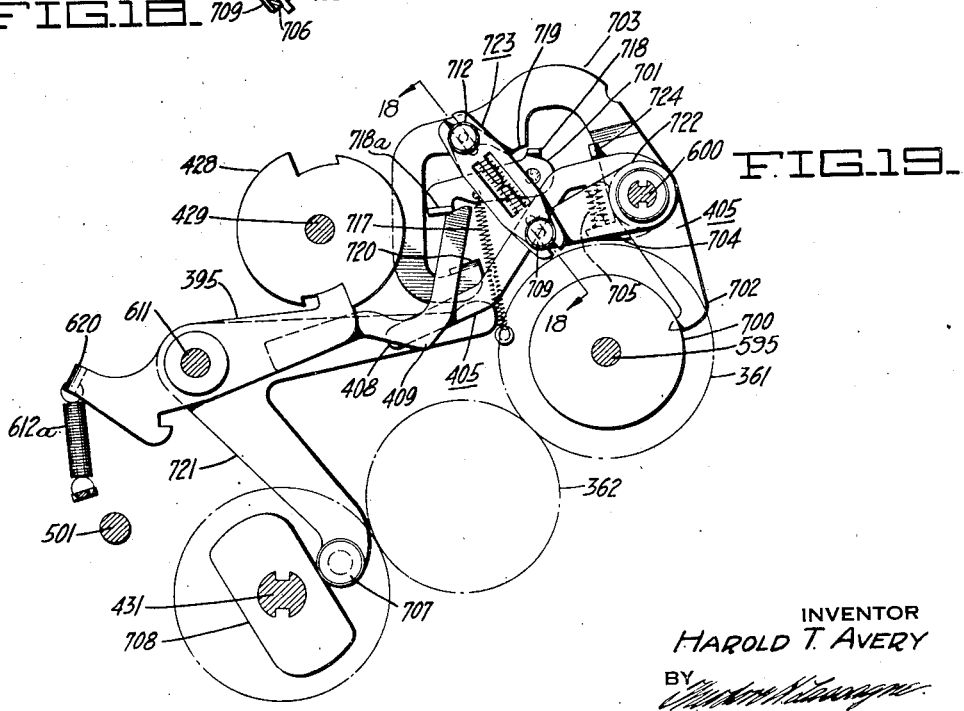
INVENTOR
HAROLD T. AVERY
BY
ATTORNEY July 28, 1942. H. T. AVERY 2,291,134
CALCULATING MACHINE
Original Filed Dec. 18, 1933 17 Sheets—Sheet 11

INVENTOR.
HAROLD T. AVERY
BY
ATTORNEY

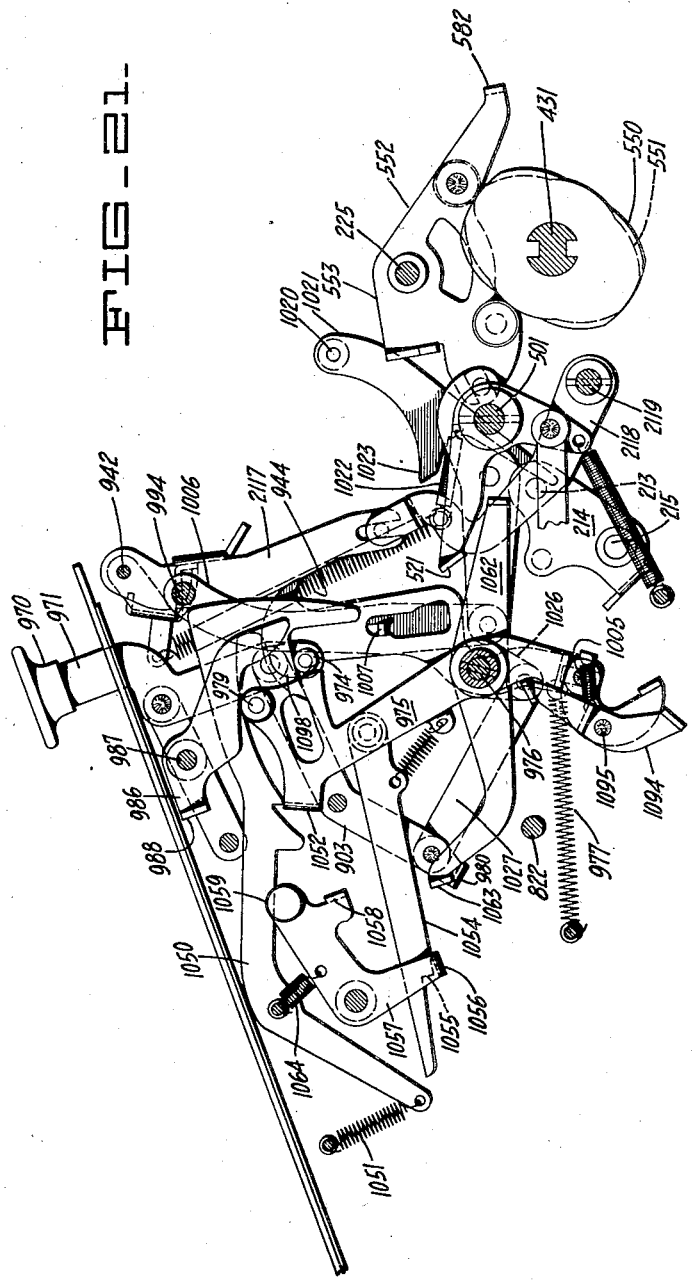

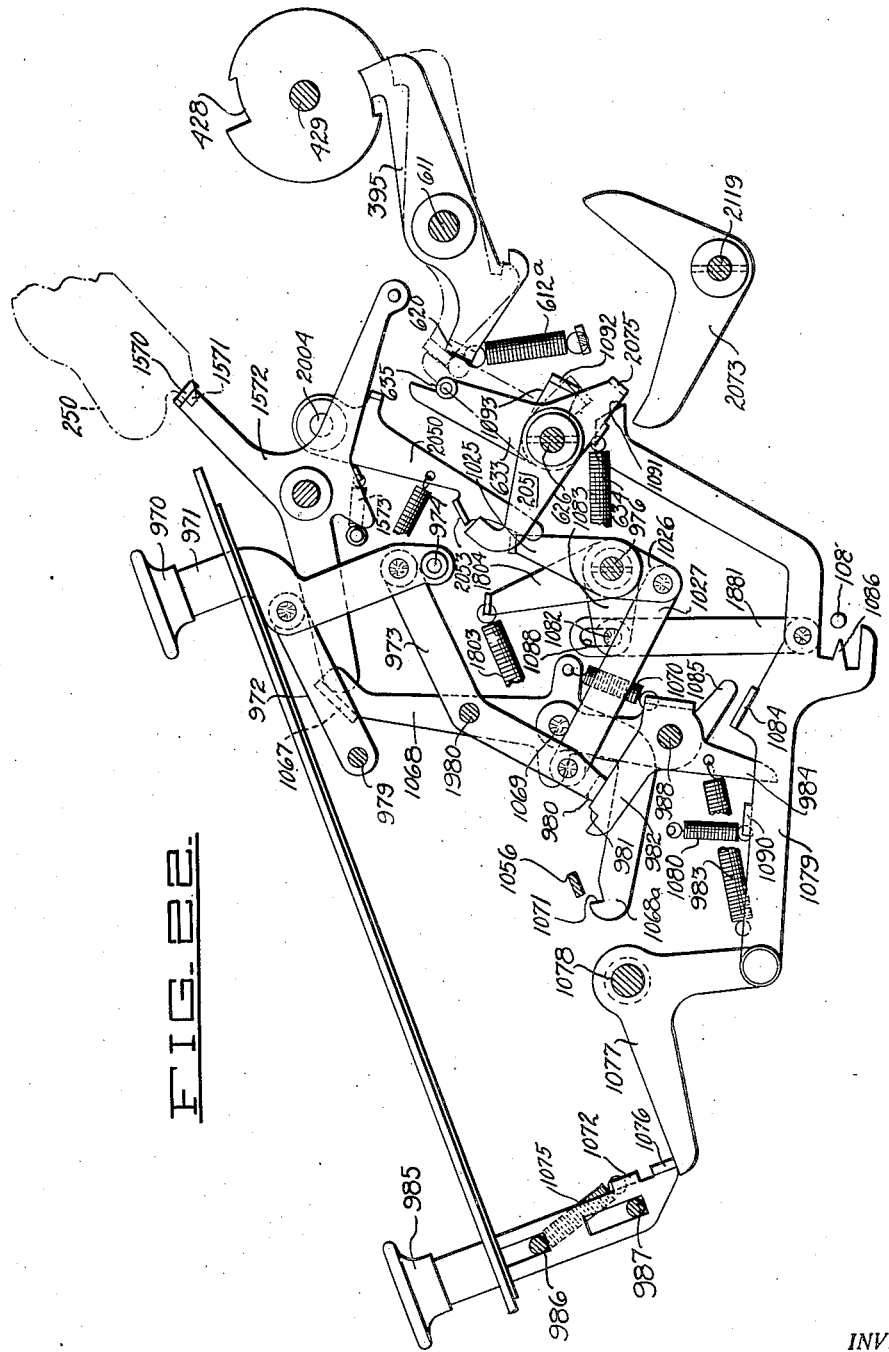

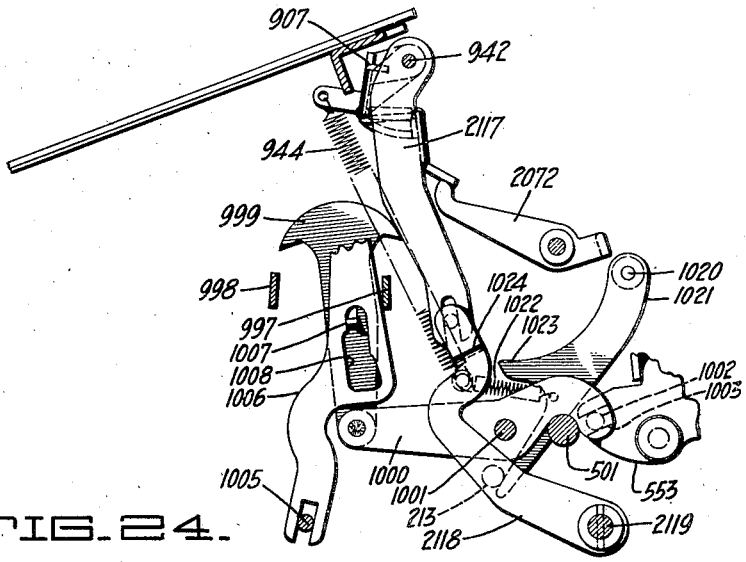
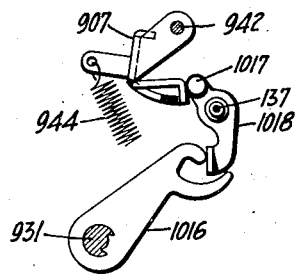
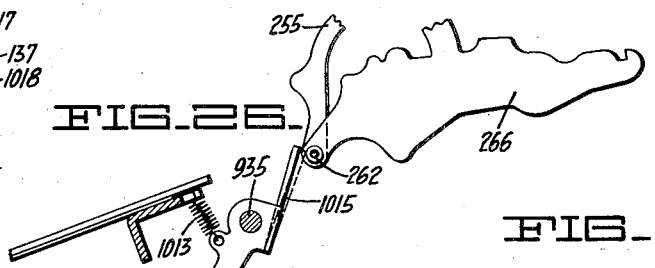
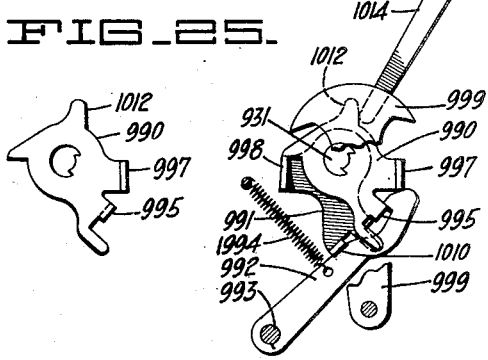
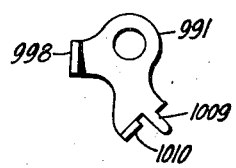

July 28, 1942. H. T. AVERY 2,291,134
CALCULATING MACHINE
Original Filed Dec. 18, 1933 17 Sheets-Sheet 15

INVENTOR
HAROLD T. AVERY
BY
ATTORNEY

FIG_31.

July 28, 1942. H. T. AVERY 2,291,134
CALCULATING MACHINE
Original Filed Dec. 18, 1933 17 Sheets-Sheet 17

INVENTOR
HAROLD T. AVERY
BY
ATTORNEY

Patented July 28, 1942

2,291,134

UNITED STATES PATENT OFFICE 2,291,134

CALCULATING MACHINE

Harold T. Avery, Oakland, Calif., assignor to Marchant Calculating Machine Company, a corporation of California Original application December 18, 1933, Serial No. 702,949. Divided and this application January 19, 1940, Serial No. 314,597

16 Claims. (Cl. 235—62)

This invention relates to calculating machines of the type capable of performing division calculations and has particular reference to means for stopping a calculating machine during a division operation.

One object of the present invention is to arbitrarily arrest the operation of a calculating machine at any time during a division calculation.

Another object of the invention is to selectively stop a calculating machine during division either at the completion of a division operation in a current order or before, under manual control.

Another object of the invention is to enable a manually operable member, on one movement thereof, to stop the machine at the end of a division calculation in any desired order and, on another movement thereof, to stop the machine substantially immediately.

The invention is illustrated as applied to a calculating machine constructed in accordance with the disclosure of the Avery application Serial Number 702,949, filed December eighteenth, 1933, and since matured into Patent Number 2,211,736, issued August 13, 1940, of which the present application is a division, and to which reference is hereby made for a disclosure of the complete calculating machine, including mechanisms not specifically disclosed herein. It is understood, however, that the invention may also be applied to other calculating machines capable of performing division calculations.

The manner in which the above and other objects of the invention are accomplished will be readily understood on reference to the following specification read in conjunction with the accompanying drawings wherein:

Figure 2 is a section in side elevation, illustrating the keyboard for selecting a value, and a portion of the actuator mechanism.

Figure 3 is a section taken along the line of 3—3 of Figure 2, showing the typical construction and mounting of a key.

Figure 4 is a sectional detail of a check dial.

Figures 6, 7, 8, and 9 are sections taken through the carriage to illustrate the construction of the accumulator and counter mechanisms, the sections being taken so as to bring out the interaction and relationship between certain of the parts.

Figure 10 is a front elevation, partly in section, of two dial assemblies, illustrating the manner of construction thereof.

Figure 11 is an exploded perspective view of the dial assembly.

Figure 12 is a schematic view showing the various units and their relationship to the driving means.

Figure 13 is a side elevation of the mechanism for controlling the setting clutch.

Figure 14 is a side elevation of the mechanism for controlling operation of the main clutch.

Figure 15:
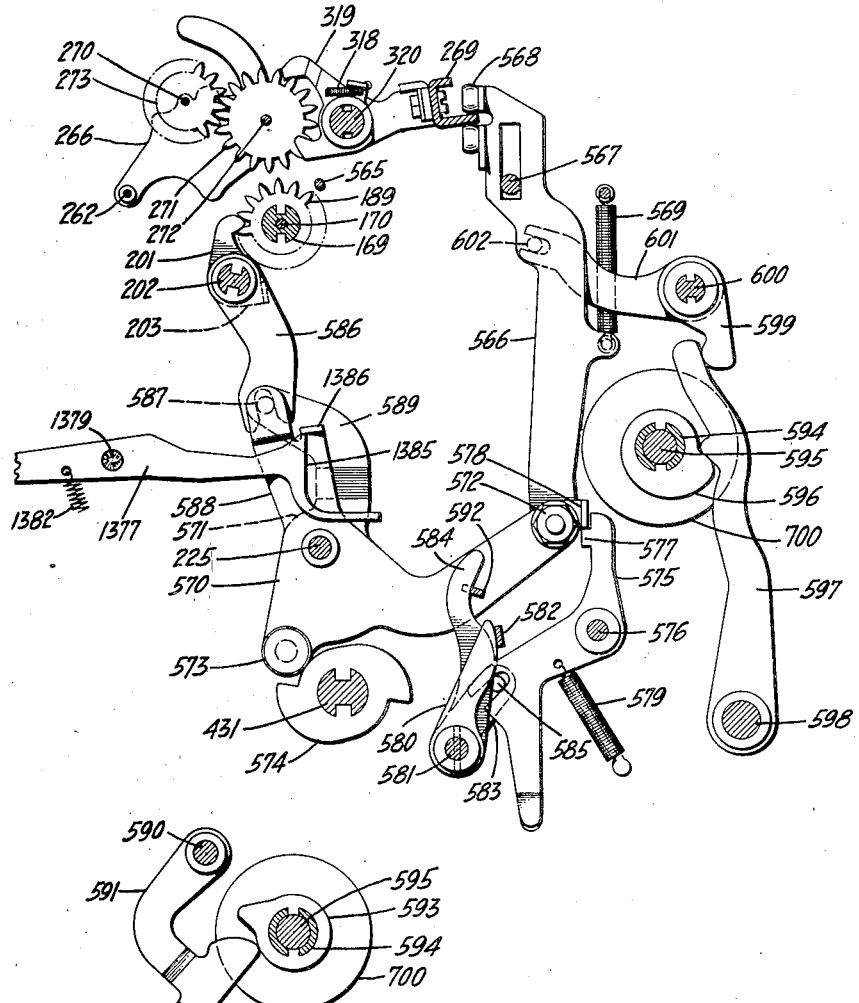

Figure 15 is a side elevation, partly in section, illustrating the carriage dipping mechanism, and certain mechanism utilized in connection with the shift operation of the carriage.

Figure 16:
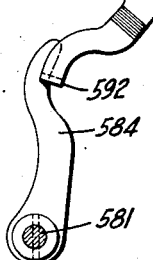

Figure 16 illustrates certain details of the mechanism utilized in connection with the carriage dipping mechanism.

Figure 17 is a side view of the reverse control unit and its controlling mechanism.

Figure 18 is a section taken on the line 18—18 of Figure 19, illustrating the construction of a spring link.

Figure 19 is a detail view showing the restore clutch and mechanism for controlling this clutch.

Figure 20:
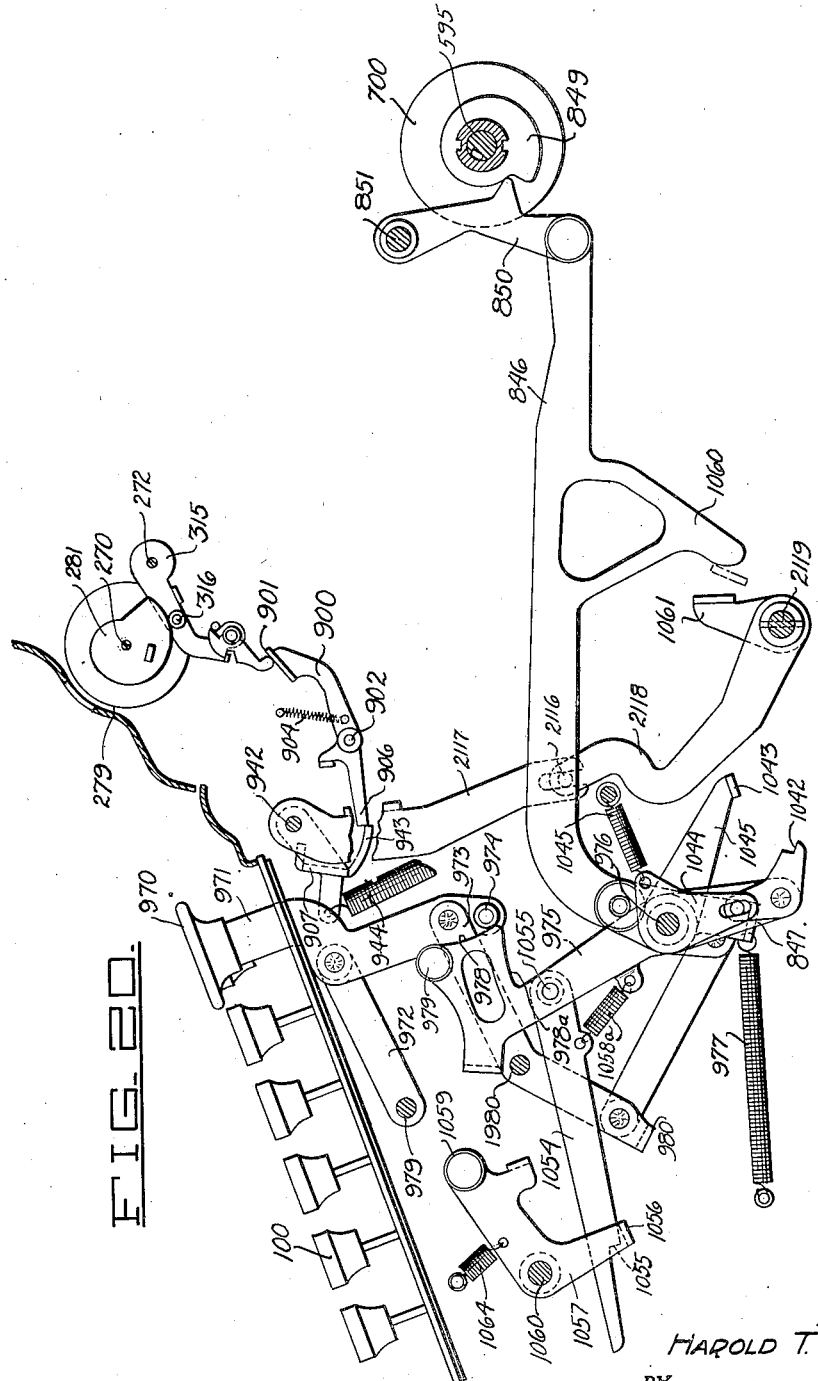

Figure 20 is a transverse sectional view showing the division operating key, the mechanism for automatically arresting operation of the machine at the end of a division calculation in each carriage position, and a restoring mechanism.

Figure 21 is a side elevation showing certain of the division control mechanisms.

Figure 22 is a transverse sectional view illustrating the division key, the stop key, and the various latch mechanisms which are set to maintain the machine in operation during division calculations, and which are adapted to be unlatched under control of the stop key.

Figure 23 is a detail view illustrating the control of the division sensing mechanism and the division bail, sometimes known as a gate.

Figure 24 is a fragmentary view illustrating certain mechanism utilized for rocking out the division gate.

Figure 25 is a detail of a member utilized in controlling the shaft controlling certain of the division mechanisms.

Figure 26 illustrates, in side elevation, mechanism for preventing the shift of the carriage during a division operation, as well as certain mechanisms for operating the shaft which controls a portion of the division mechanism.

Figure 27 is a detail of a member utilized in connection with the locking of the aforementioned shaft.

Figure 28:
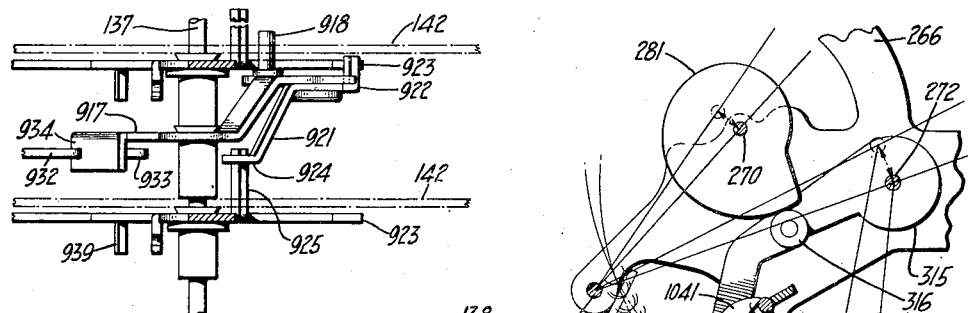

Figure 28 is a plan view illustrating a portion of the division mechanism; particularly the means for transmitting from a lower order of the sensing and control mechanism to the next higher order the decimal value of the value set in the lower order.

Figure 29:
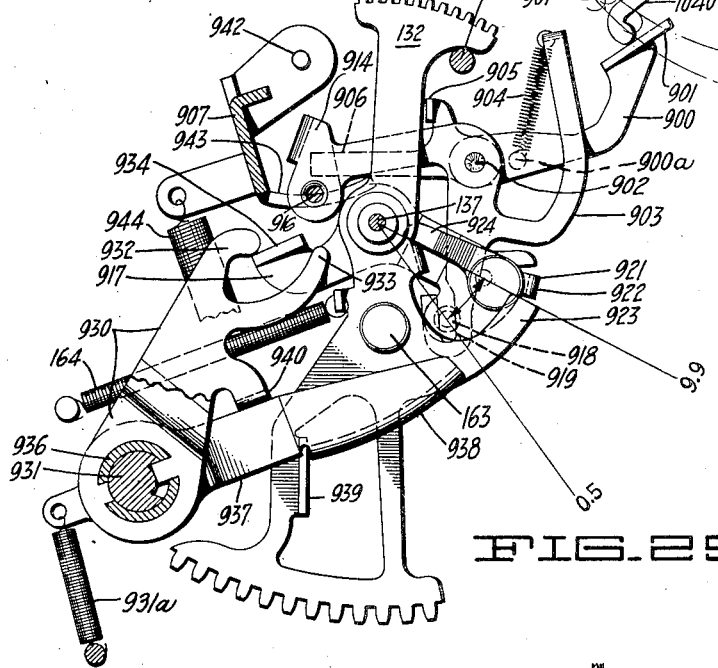

Figure 29 is a side elevation illustrating the relation of the division sensing mechanism to the accumulator mechanism, and the controls therefor.

Figure 30:
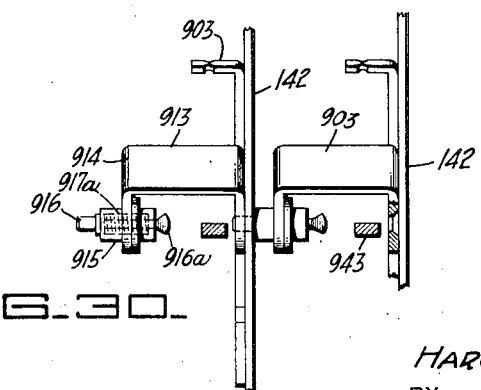

Figure 30 is a fragmentary view showing the manner of supporting certain portions of the division mechanism between the base plates of the machine.

Figure 31:
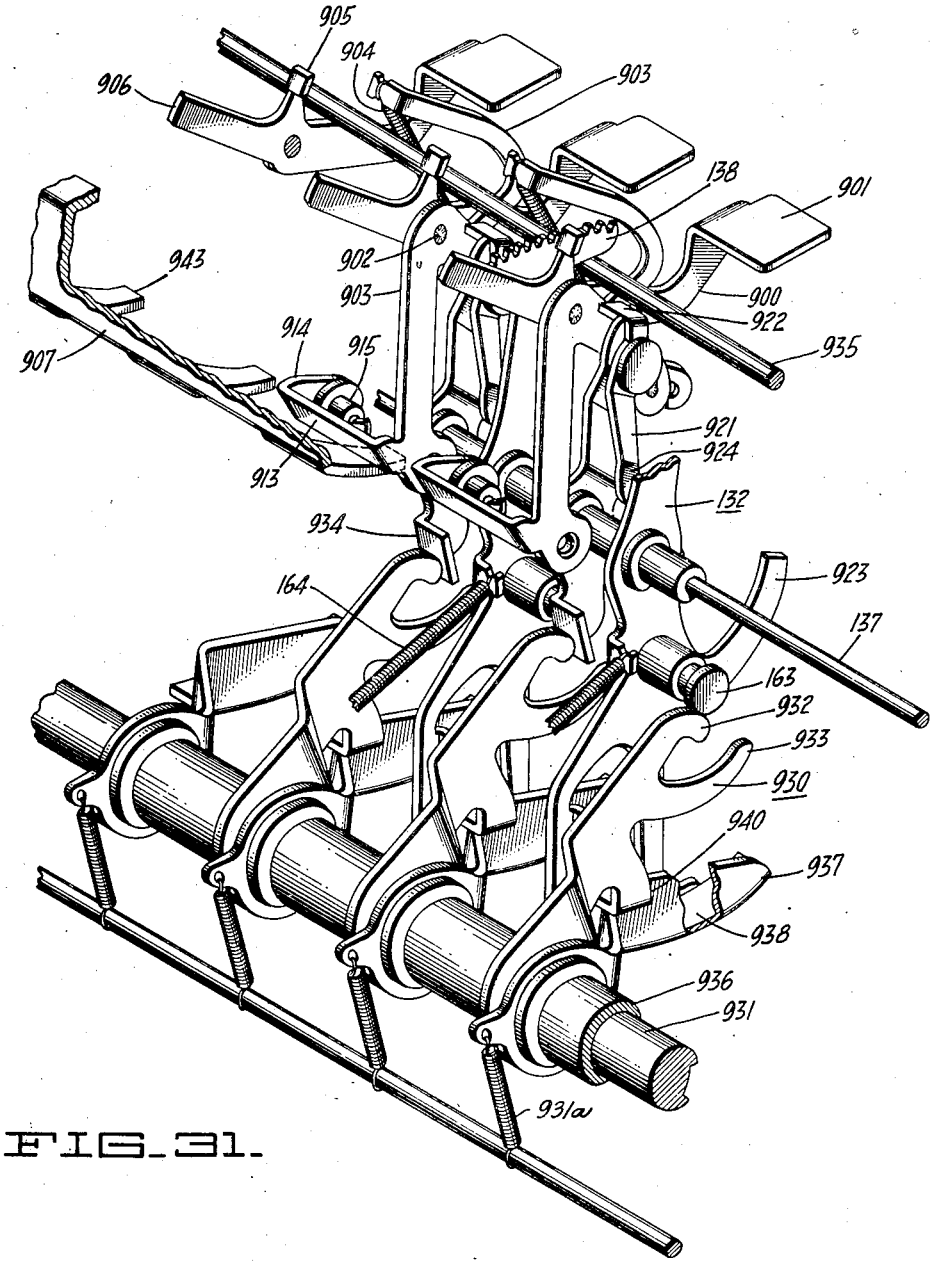

Figure 31 is a perspective view illustrating certain of the division sensing mechanism, and its controls.

Figure 32:
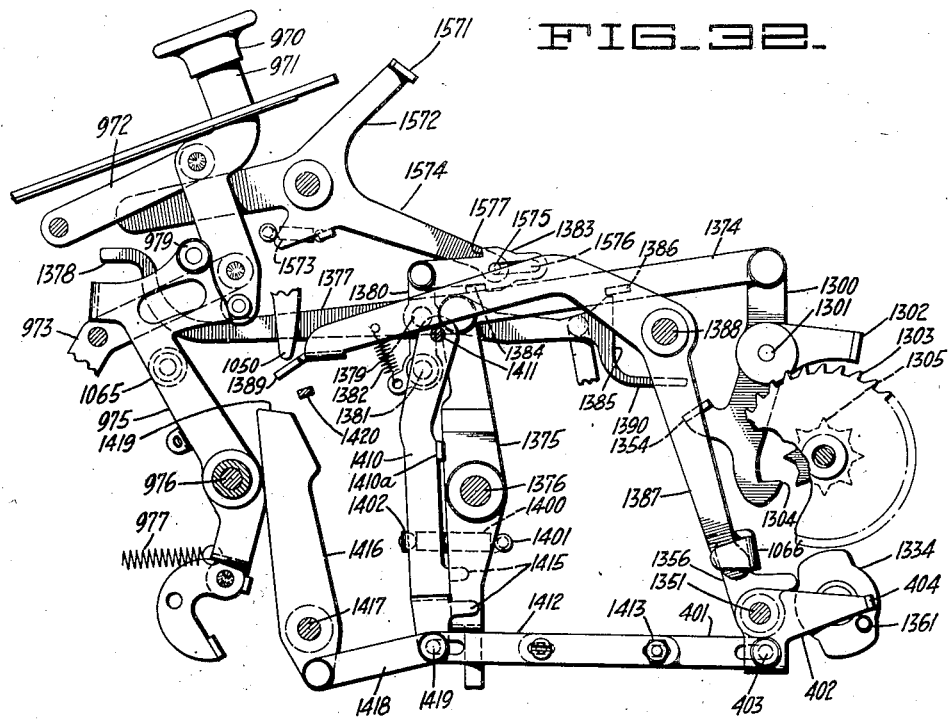

Figure 32 is a side elevation illustrating the controls utilized in connection with automatic carriage shifting.

Figures 33, 34:
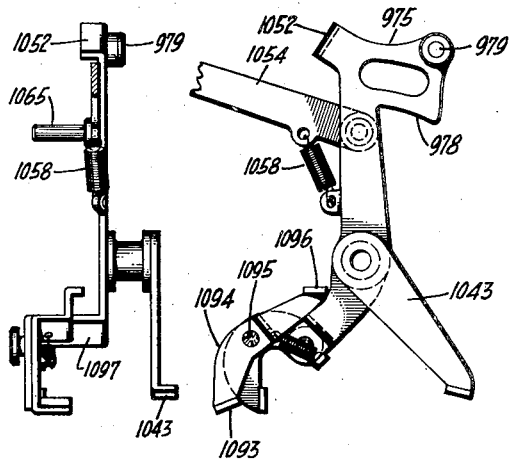

Figure 33 is a detail view, in end elevation, of one of the division control members, and Figure 34 is a detail view, in side elevation, of said member.

The machine to which the present invention is applied utilizes the well known "tear down" method of division calculation, wherein the divisor is subtracted as many times as possible from the dividend to obtain the quotient. The first quotient figure is derived by subtracting the divisor as many times as possible from the highest series of denominational orders of the dividend in which the divisor is contained, the second quotient figure, by subtracting the divisor from the highest remaining series of orders in which it is contained, and so on.

This method of determining the quotient is generally carried out by setting up the dividend in a series of dials in an accumulator register mounted on a shiftable carriage, while setting up the divisor in a series of keys in a keyboard. The carriage, or the accumulator register actuating mechanism is so positioned relative to the various keys depressed on the keyboard, or vice versa, that on beginning the multiple subtraction process, the divisor will be subtracted from the highest series of register dial orders into which it can be contained, thereby deriving the first quotient figure which appears on a suitable counter. Thereafter, the carriage is automatically shifted one order to the left, which has the same effect as multiplying the remainder by ten, and the same procedure of deriving the next lower order quotient figure is followed through.

It is often desirable to stop the machine before the quotient figure in the last order of the counter is reached, while at the same time obtaining a true quotient in those orders in which division has taken place.

Again, it is often desirable to stop the machine before the end of the division operation in a certain carriage position, as for example, if the division operation has accidently been initiated with a set-up in the accumulator register dials and none in the keyboard. In this case, the machine will continue to operate indefinitely because no subtraction will take place.

Another example wherein it would be desirable to stop the machine before obtaining the true quotient figure in a current order would be in a case where the division operation was initiated with the carriage positioned too far to the left, as for example, if the accumulator register and keyboard relation were such that a single digit would have to be subtracted a number of times from a three or four order number before obtaining the first quotient figure.

The present invention, in its preferred form, provides a single stop control key which, when depressed once, will cause the machine to stop when a true quotient figure has been obtained in the actuated order of the counter and which, when depressed a second time, will stop the machine immediately, and possibly before such "digit completion" is effected in the actuated order. This mode of operation of the stop key follows the natural action of an operator who will instinctively strike the stop key a second time if the machine fails to stop as soon as was desired when the key was first struck.

*Manually set selection mechanism*

The machine disclosed in the above identified Avery application is of the key set type in which means are provided for first setting one factor of a calculation upon a keyboard or equivalent mechanism, and subsequently operating the machine in a manner indicated by the character and amount of another factor of the calculation.

The mechanism for setting up the first factor may be considered as comprising a manually operated and a power operated portion, the manually operated portion being designed to be moved to a selected controlling position by the depression of keys or the setting of equivalent mechanism, and the power operated portion being designed to be brought into operation immediately prior to the operation of the calculating mechanism and to act under the control of the manually set mechanism to move elements of the calculating mechanism to the proper position to cause operation thereof to enter the value set up on the keyboard.

Figure 1:
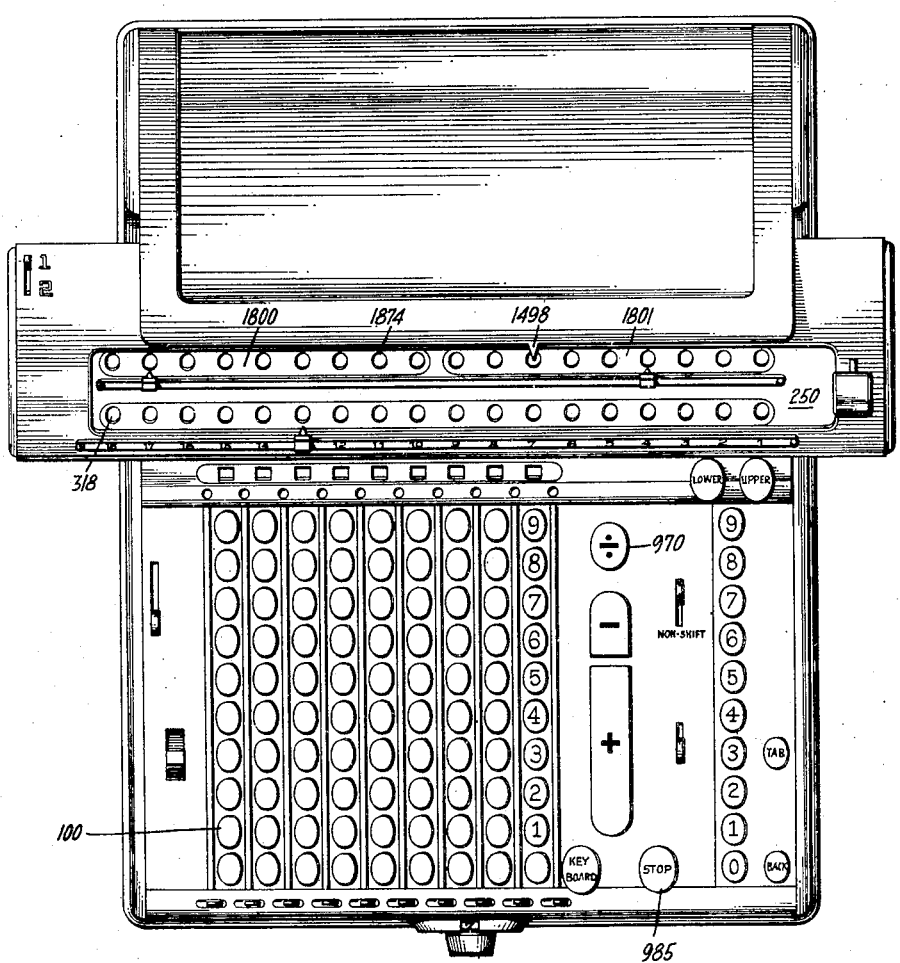
Figure 1 is a plan view of the machine in which the present invention is incorporated.

In a machine designed for calculation in the decimal system, the keys are preferably arranged, as shown in Figure 1, in a series of banks of ten keys each, the number of banks provided in each machine depending upon the magnitude of the factors with which the machine is designed to deal.

The construction of one bank of keys is shown in Figures 2 and 3 on Sheet 2 of the drawings. Each key section comprises the usual number of value keys 100, which are slidably mounted in a channel key frame 101 and are normally maintained in raised position by suitable coil springs 102. The key stems 103 are assembled into the channel frame 101 (see Figure 3), by insertion from the top, the slot in the upper side of the channel member being of sufficient width to pass the projection 104 of the key stem, but the registering slot in the lower side being of lesser width, preventing the key stem from dropping through and also adapted to contact projection 104 to provide a limiting stop in operation of the mechanism.

After insertion of the key stems, a strip 105 is secured in place by means of screws 106, thus blocking a portion of the upper slot and preventing withdrawal of the key stems. Strip 105 also carries a strip 107 of rubber or other resilient material against which projections 104 abut when the key stems 103 are pressed upward by their springs. This serves to diminish the noise ordinarily incident to the release of keys from their latching means and their return to raised position. Each key section is mounted in the machine between members 108 and 109 which extend between the side plates of the machine.

Disposed underneath the value keys "one" to "nine" inclusive, is a differentially settable bar 120 which is pivotally suspended from the key section frame 101 by means of two parallel links 128 and 129. This bar 120 has nine identical notches 130, each of which has at its bottom a downwardly extending slot 131 adapted to receive the end of a key stem 103. The vertical center lines of the key stems 100 are spaced an equal distance apart. This distance, however, is slightly greater than the spacing between successive slots 131 so that each succeeding slot 131 will be spaced one increment further away from its cooperating key stem. This spacing is proportioned in such a way that depression of a value key will cam the bar 120 to the rear, a number of increments equal to the value represented by the depressed key.

Movement of each bar 120 is utilized to set up a mechanical representation of the selected value whereby the calculating mechanism may be accordingly controlled. A swinging segment member 132 is mounted upon a common shaft 137 which supports like members associated with other key banks. This member is provided at opposite ends with arcuate racks 138 and 139, which serve to transmit the movement of the differential bar 120 respectively to a check dial assembly 140 positioned on a shaft 141 in alignment with similar dials associated with the other key sections so that the value set up on the entire keyboard is read in a straight line of dials, and to a cam unit 146 having a series of cams each comprising high and low points which are angularly displaced relative to the corresponding points on an adjacent cam. The cam unit is thus positioned by such movement so as to form a mechanical representation of the number set up whereby the calculating mechanism may be controlled as set forth in the above identified Avery application.

The aforementioned cam unit 146 is driven through a gear 151 forming a portion of the unit (Figure 2), the gear being in mesh with rack 139 on member 132. The member 132 and the selection bar 120 are connected by means of a pin and slot connection 163 so that the member is rotated directly about the shaft 137 upon depression of any key. Upon release of a depressed key, the return spring 164 (Figure 2) acts to return cam unit 146 associated therewith and the check dial to zero position.

*Power set selection mechanism*

After the setting of the mechanism heretofore described has been completed and upon manipulation of one of the operating controls, the power operated portion of the selection mechanism is brought into operation prior to operation of the calculating mechanism, and acts, under control of the cam units 146, to move elements of the calculating mechanism to the proper position to condition it for effecting entry of the value set up on the keyboard into the accumulator.

Figure 5:
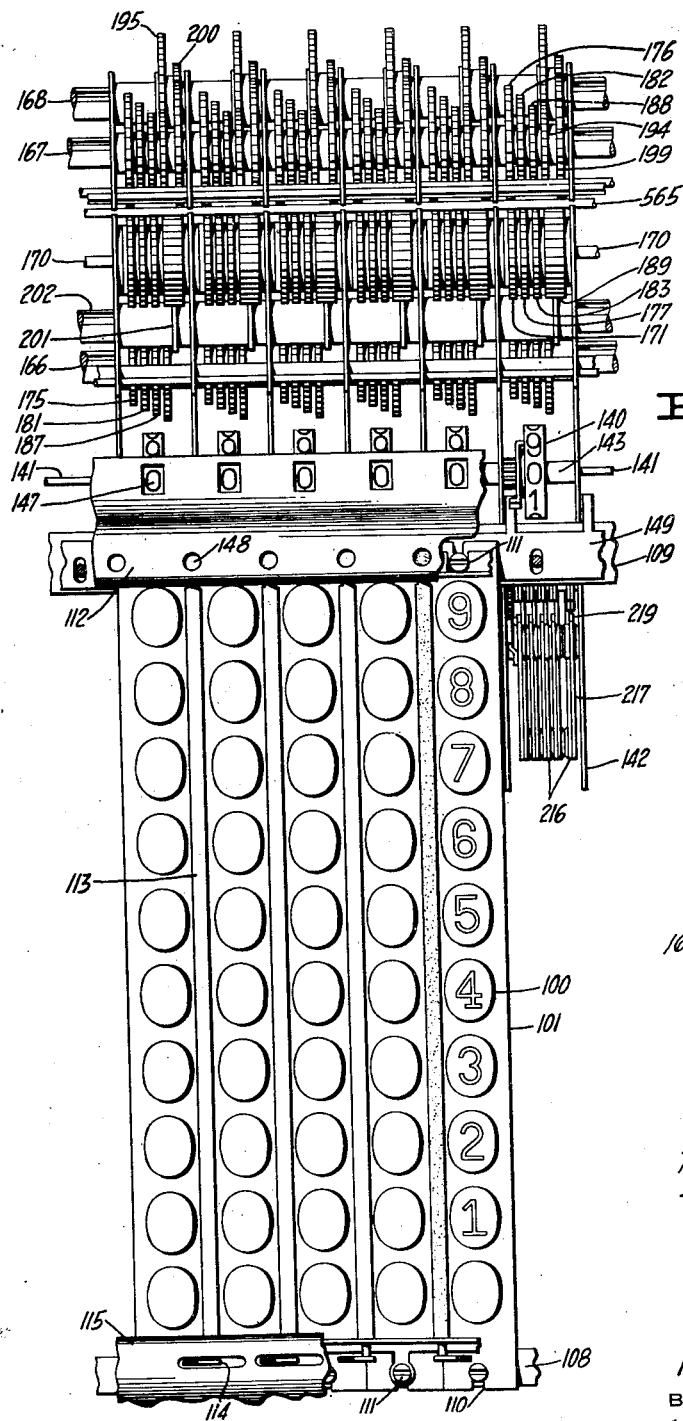
Figure 5 is a section taken generally along the line 5—5 of Figure 2, illustrating the arrangement of the keyboard and the actuator mechanism.

This mechanism comprises three shafts 166, 167, and 168, hereinafter referred to as the half, quarter, and twelfth speed shafts, respectively (Figures 2 and 5), and common to all orders of the machine. The shafts are connected to the prime mover through gearing and a cyclic clutch as hereinafter described, so that shaft 166 rotates through 180° for each cycle of operation of the machine, shaft 167 rotates through 90° for each cycle of operation of the machine, while shaft 168 moves through 30° for each cycle of operation. A series of sleeves 169 (Figure 2), one for each decimal order, is freely mounted on a common pivot shaft 170 disposed between the shafts 166, 167, and 168, and each sleeve has keyed thereto several spaced gears for driving the several orders of the registering mechanism, as hereinafter described.

Means are provided for connecting each of the several sleeves 169 so that each sleeve can be selectively locked or driven by shaft 166, shaft 167, or shaft 168 at any of nine different rates with respect to the prime mover, said rates corresponding to the values delineated upon keys 100. Since this mechanism, which is duplicated in each decimal order of the machine, is fully described in the above identified Avery application, only a brief description of its operation will be necessary to an understanding of the present invention.

Figure 5A:
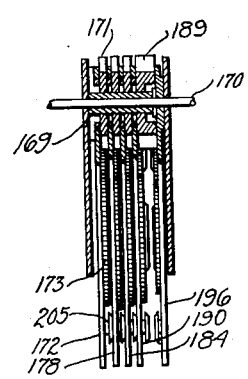
Figure 5A is a sectional view taken through the five selection plates in one of the decimal orders.

Five selection plates 172, 178, 184, 190, and 196 (Figures 2 and 5A) are pivotally suspended on sleeve 169 in each order, and each has mounted thereon a pair of entrained gears as at 173 and 174, the latter meshing with a gear keyed to the sleeve 169. The gears 173 and 174 have different gear ratios on the different plates. One of the five plates of each order is positioned during a selection operation to select a value or zero, the remaining four plates of the order being held in idle position. The value positions are positions in which the plate-carried gears mesh with gears on shafts 166 or 167, while the intermediate position is that in which no such connection is effected. Thus, if a "six" is to be selected, by way of example, plate 172 will be swung to the left in Figure 2, to engage its gear 173 with gear 175 on shaft 166, while all the other plates will be positioned in intermediate or idle positions.

This simultaneous setting of the selection plates is effected by power driven mechanism which senses the cam units 146 hereinbefore mentioned. This mechanism comprises a group of five identical feeler arms 210 (Fig. 2), one for each of the five plates 172, 178, 184, 190, and 196, and pivotally connected thereto by studs 205. Each arm is provided with a sensing nose 211 adapted to be pressed against the associated cam with which it is in radial alignment. These feeler arms 210 are pivotally supported on a common shaft 213 supported by links 214 pivoted to the frame of the machine at 215, and each feeler arm 210 is connected by a link 216 with a second feeler arm 217 pivotally mounted on a shaft 218 supported in the frame, and provided with a sensing nose 219 adapted to contact the same cam at a point approximately 180° removed from the point at which it is contacted by nose 211. This sensing system is actuated by a plurality of pairs of complementary cams 220 and 221 adapted to be driven by means hereinafter described, and cooperating with cam followers 222 and 223 to rock a lever 224 pivoted to the frame at 225 and connected by a link 226 with shaft 213.

In operation, as cam lever 224 is rocked by these cams, each set of sensing noses 211 and 219 will be moved toward that cam in the cam unit 146 with which it is in radial alignment, and if nose 211 meets a low point 161 of one of the cams, the nose 219 will meet the opposite high point 160, thereby rocking the connected selection plate into its forward position, as viewed in Figure 2. If, on the other hand, nose 211 meets a high point 160 of one of the cams, the nose 219 will meet the opposite low point 161 and the selection plate to which arm 216 is attached will be moved into its rearward position, as viewed in Figure 2.

If, in the third case, nose 211 meets only an intermediate portion and does not engage either a high or a low point of a cam, nose 219 will do likewise, and the connected plate will be positively positioned in central or neutral position in which its idler gear 173 will be out of mesh with the gears on both shafts 166 and 167.

To accurately position each cam in cam unit 146 before this sensing operation, a pawl 230 (Figure 2) is mounted on shaft 216 and is urged by spring 231 against pin 232 on link 214. When link 214 is moved, the pawl is released to engage gear 151, aligning the unit 146 of which the gear forms a part, and holding it against possible displacement during sensing.

The five cams, composing each selection cam unit 146, have their respective high and low points so positioned around their peripheries, and are so offset with respect to each other that if one of the feelers 211 in each order meets either a high or a low point on one of the five cams, the other four feelers 211 in the same order will not meet either a high or a low point on their associated cams. Thus, in each sensing operation, only one of the five selection plates will be rocked either forwardly or rearwardly, the other four of said plates in that order being maintained in their intermediate or neutral position. Thus, the gears carried by each sleeve 169 can be operatively meshed only by a single train with one of the gears carried on either shaft 166 or shaft 167, or else locked by pawl 201. By this means, any selection from "zero" to "nine" inclusive, is effected in each decimal order under the control of keys 100.

Means are provided for locking the selection plates in the relationship above described, comprising a lock gate 236 (Figure 2) extending across all orders in the machine. The gate is pivoted to the frame of the machine at 237 and engages one of three notches 238 in each selection plate to hold said plate against movement in either direction. All the selection plates are engaged simultaneously, the gate being operated by the setting clutch mechanism hereinafter described.

Accumulator mechanism

From the foregoing description of the selection mechanism, it is apparent that a number comprising a plurality of figures can be registered upon the several sleeves 169 by differentially driving the gears attached to these sleeves various distances proportionate to the quantitative relation of the several figures composing the number. However, in order to perform any mathematical computation such as addition, subtraction, multiplication, or division, mechanism must be provided for advancing a superior registering element one extra increment whenever the next lower element has made a complete rotation. This process is known as "carrying the tens," in a machine operating according to the decimal system.

In the present machine this function is accomplished by accumulator mechanism mounted in a carriage 250 (Figure 1), the main frame of which comprises end plates connected by a top plate 252 (Figure 6) having apertures to receive lugs on the end plates and secured at its forward end by screws which extend into the end plates. The forward end of plate 252 is notched to fit into notches in brace plates 255 (Figure 8) and to provide extension 256 fitting between adjacent brace plates 255. Screws 258 secure ears on some of the brace plates to the top plate 252 (Figure 6). The front and rear carriage track shafts 259 and 260, the ends of which are journaled in the two end plates, and the several other cross shafts to be hereafter described, serve as additional bracing means for this main frame structure.

Mounted at even intervals between the two end plates are a series of carriage brace plates 255 (Figures 6, 7, 8, and 9) having lugs 261 projecting through spaced slots in the top plate 252 and supported at the front of the carriage by a cross shaft 262. Locked spacing combs 263 extend through spaced slots in each brace plate and are locked in place by rods 264, while the top plate 252 spaces adjacent plates 255, as has been described. A retaining comb 265 secured to the top plate 252 spaces the rear edges of the plates and, by underlying lugs 2650 formed on said plates, serves to hold lugs 261 in their notches in the top plate.

Supported in the end plates and by the several brace plates 255, is the cross rod 262 which serves as a pivotal support for a series of plates 266 (Figure 8), one of which is mounted on said rod 262 adjacent each of the carriage brace plates 255. These plates 266 are spaced and braced adjacent their forward ends by comb 267 interlocking with slots in each plate 266 and held in place by rod 268. The plates are connected at their rear end by a common bail 269 known as the "dipping bail," by means of which the entire body of plates 266 can be simultaneously oscillated about shaft 262 during operations hereinafter described (see Figure 15 also), in which description the mechanism supported by said plates 266 is referred to as the "dipping carriage."

The units of the accumulator are assembled on a shaft 270 supported by plates 266, there being one of such plates 266 between each adjacent unit, so that each unit forms a separate assembly between two of said plates. Each unit is adapted to be driven by one of the selection gears (Figures 2 and 15) with which intermediate gears 271, rotatably mounted on shaft 272 and entrained with the gears 273 of the several accumulator units, may be meshed by lowering the dipping carriage, as hereinafter described. Suitable clearances are provided on the several plates 255 to permit the necessary connections between the orders of the accumulator for effecting tens transfer or carry operation.

Referring more particularly to Figures 10 and 11, it will be noted that each accumulator unit comprises a spider 274 which is rigidly secured to a sleeve 275 on shaft 270. This spider 274 carries an internal ring gear 276 on its right hand side, which is spot welded or riveted to the flared out portion 277 of each of the spider arms. A right angular extension 278 of one of said arms projects toward the right from said spider, slightly beyond the right side face of a thin shell 279 fixed to the spider 274 and the internal gear 276 thereon, and serves as a zero stop in resetting operations described hereafter. The periphery of said shell 279 is sufficiently wide to accommodate the digits ranging from "zero" to "nine" arranged as shown. Integral with the sleeve 275 surrounding said shaft 270 is a sun gear 280 abutting a plate 266, and interposed between said sun gear 280 and the spider 274, is a snail cam 281 and spacer 282.

The snail cam 281 (see also Figure 8) has an aperture through which projects a lateral extension 283 of spider 274, thus causing said cam and spider to rotate as a unit and the sleeve 275 is riveted over the spider, forming these parts into a functional unit.

Located immediately to the right of mechanism just described is a plate 292 fixed to the spur gear 273 which is driven by a gear 189 through an intermediate gear 271 when plates 266 are dipped. These elements are rotatably mounted on a sleeve 293 which in turn is rotatably mounted on a sleeve 294. Plate 292, which includes an apertured ear 295 for use in timing is, in turn, fixed to a member 296 by studs 297. Provided at each end of said member, and on each of said studs is mounted a planet gear 298 meshing with the ring gear 276 carried by spider 274 and with another sun gear 299 formed integrally with sleeve 293. Thus, the spur gear 273, the plate 292, the planet gears 298, and the ring gear 276 constitute a planetary assembly which rotates about the sun gear 299 and comprises the means by which the numeral bearing shell 279 can be rotated by the actuating mechanism of the machine which drives the gear 271 as hereinafter described. Secured to the right end of the above mentioned sun gear sleeve 294 is a spider 300 carrying an internal gear 301, the spider and gear being provided with four lugs 302 which serve as assembly guides and as stops, as hereinafter described. The spider also includes four apertured ears 303 for use in timing, as will appear.

For the purpose of carrying tens, means are provided for driving the spider 274 and its associated dial shell 279 by means of the spider 274 of the next lower order independently of any movement of the gear 273. This means includes the aforementioned internal gear 301 and another unit sub-assembly now to be described. Sleeve 294 which, as previously described, supports the sleeve 293 on shaft 270, is provided with a double arm member 304, one arm 305 of which is apertured, while to the other, 306, is secured a stub shaft 307 to which are fixed planet gears 308 and 309. The planet gear 308 meshes with the internal gear 301 on spider 300 while the planet gear 309 meshes with the sun gear 280 of the adjacent lower order. Sleeve 294 includes an integral spacer 310 so that gear 308 is positioned in alignment with ring gear 301 and does not abut the spider 300, and the end of the sleeve is riveted over to secure member 304, thus providing another unit assembly. The central portion of member 304 is equipped with a gear segment 311 meshing with teeth 312 (Figure 9) formed on a lever 313 pivoted to a shaft 272 which is mounted parallel to the shaft 270 in the plates 266. Lever 313 includes an extension 314 engaging a lever 315 also mounted on shaft 272 (Figure 8) which lever carries a roller 316 in the same plane as snail cam 281. Lever 313 is urged clockwise by spring 318 so that the roller 316 carried by lever 315 is urged thereby into contact with the adjacent snail cam 281. In the units order the sleeve 293 may be secured directly to the plate 266 adjoining it at the right, inasmuch as there is no lower order from which tens must be carried.

This arrangement of the several accumulator units permits simultaneous digitation and tens transfer operations known in the art as "duplexing."

In operation, the gear 273 is driven by the actuating mechanism and revolves planetary gears 298 about shaft 270 as a center. Where, as in the units order, the sleeve 293 with its sun gear 299 is fixed, this revolution of gears 298 will, since they are in mesh with sun gear 299, cause them to also rotate about studs 297 and thus drive ring gear 276 ahead in the direction in which gear 273 is being driven. Since ring gear 276 is fixed to the indicia bearing shell 279, this movement will bring a figure opposite the sight opening 318 in the carriage cover, indicative of the portion of a rotation given gear 273.

Whenever a given amount is thus entered in any one unit of the accumulator, one tenth of that amount will be entered in the next higher unit by means of the carrying mechanism comprising sun gear 280 fixed to spider 274 and driving planetary gears 308 and 309, these in turn, driving internal gear 301 fixed to sleeve 293 of the next higher unit in a direction opposite to that of spider 274, and, by rotating said sleeve, driving sun gear 299 integral therewith. If gear 273 is stationary, the movement of sun gear 299 rotates ring gear 276 in the direction opposite to that of gear 299 and therefore in the same direction as that of the lower order dial transmitting the carry. If gear 273 is moving to introduce digitation, as previously described, ring gear 276 will move by an amount equal to the resultant of that produced by the rotation of gear 299 and that produced by the rotation of gear 273, the movement of the ring gear, of course, being the resultant of the movement of the sun gear and the displacement of planetary centers. Thus the movement of any higher order dial becomes the resultant of the digitation entry into its own order and the carry movement from the next lower order.

In order that this tens-carrying movement may be properly transmitted to all units of the accumulator, it is desirable that digitation gears 273 move only in accordance with values being introduced into the accumulator. To this end means are provided to prevent movement of the gears 273 except as values are being introduced. This means comprises spring pressed pawls 319 (Figure 6), freely mounted on a shaft 320, each of which is adapted to engage the associated intermediate gear 271 in each order. As described above, these gears 271 mesh directly with the gears 189 of each accumulator unit (Figure 15) and each pawl 319 therefore acts as a retaining means for one of said gears, being released during actuation, as will presently appear.

Thus, from the foregoing description, it is apparent that rotation of a numeral wheel in any order will cause all the numeral wheels in the higher order or to the left thereof, to also rotate a certain amount successively either in additive or subtractive direction, depending upon the direction of rotation of gears 273, while in all the orders of a lower value or to the right of the last order in which digitation takes place, no such fractional values are entered.

By virtue of this continuous gearing between the various orders, the dials are advanced so that the numerals are not properly lined up at the sight openings 318, and, in order to overcome this condition and render a readable indication of the result, mechanisms have been provided which will turn every numeral wheel to proper alignment with said sight openings directly after an actuation.

The mechanism for attaining this lineup operation of said dials comprises the snail cam 281 which is secured to the left side of each spider 274, and which cooperates with and serves to position the indirectly spring tensioned lever 315 pivoted at 272 (Figure 8). In this figure the snail cam 281 and lever 315 are shown in a position in which the roller 316 on said lever contacts with the highest point of said snail cam, which high point represents the zero position of its associated dial wheel 279. The contour of said snail cams is proportioned in such a manner that each higher digit up to nine on the dials is represented by a successive decrease in size of its radius until the lowest point on said cams represents the digit "9" on said numeral wheels; the values increasing on the dials as well as on the cams in clockwise direction, so that for addition the dials and cams are rotated in counter-clockwise direction and for subtraction in clockwise direction, when viewing the machine from the right hand side.

As the carriage is moved down into this lowered position, a notch in extension 340 on lever 313 engages a shaft 339 which is extended through plates 255. This rocks lever 313 counter-clockwise and results in member 304 moving clockwise to advance gears 309 and 308. This results in the carry from the right, received by gear 309 from gear 280 with which it is meshed and which is in the next order to the left, being entered into the next higher order. When the dipping carriage is in its lowered position, lever 315 is freed by lug 314 and permitted to fall to a position in which roller 316 is just clear of snail cam 281. Under these conditions, sleeve 294 and studs 307 (Figure 10) are held in fixed positions, and each dial is in general advanced to a partial position depending on the digitation it has received and the carry from all orders to the right. For instance, if the resultant value entered is "2,375," the first dial stands between a "2" and a "3" registration, being 0.375 of the way from the "2" to the "3" registration. The next dial stands 0.75 of the way from a "3" to a "4" registration, the next 0.5 of the way from a "7" to an "8" registration, and the next dial squarely at a "5" registration.

When the calculating is completed and the dipping carriage raised, it is desired to back up each dial by the fractional amount it stands ahead of an even registration to secure a clear registration in the sight openings. To this end, each lever 315 (Figure 8) is allowed to rock clockwise under the tension of spring 318 (Figure 9) until roller 316 rests against snail cam 281 which, with the cam shaped as already described, allows lever 315 to rock clockwise by an amount proportional to the registration on the dial to which the cam is attached. This rocking of each lever 315 rocks each associated sleeve 294 in a counter-clockwise direction, carrying stud 307 forward by an amount proportional to the registration on the dial to the right of it, thus rocking ring gear 301 by a corresponding amount and thereby backing up the next dial to the left by an amount proportional to the registration of the next lower dial, which is the amount by which the dial stood ahead of an even position. The arrangement is therefore such that each increment of carry received from a lower order will be backed out upon completion of the calculation, unless the increment amounts to an entire position, in which case the high portion of the snail cam standing under the roller prevents such backing out. The result is that when the dipping carriage is raised, each dial is controlled by the snail cam on the next lower order dial so that the proper figure will be squarely lined up to its sight opening.

The carriage is supported in the machine for transverse shifting in either direction by shafts 259 and 260 which slide through bushings positioned in side frames on opposite sides of the machine.

General calculations drive

Power for the various operations of the machine is supplied, under the control of the various control keys of the machine, through a plurality of power transmission devices including the main clutch 428, the setting clutch 430, the restore clutch 700, and the shift unit. To drive these devices, a motor 640 (Figure 12) is mounted within the frame of the machine. A flexible coupling 642 connects the motor drive shaft 643 to an overload release device such as an adjustable slip clutch 644. Any well known form of slip clutch may be used.

A pinion 645, driven by the slip clutch, drives the cyclically operable main clutch 428 through a transmission system including gear 646 carrying gear 647 meshed with gear 362, which is engaged with idler 650, which in turn engages and drives the gear 415 on the main clutch. The main clutch 428, when engaged, results in selective directional driving of the half, quarter, and twelfth speed (Figure 2) shafts under the control of a reverse unit which determines initial power application to either gear 459 or to gear 458. Thus, as appears under the description of the reverse unit, gears 459 and 458 are selectively driven through the main reverse unit, to drive the half, quarter, and twelfth speed shafts in a selected direction.

The setting clutch gear 430 (Figure 12) is driven by gear 648 on the same shaft with the gear 362 in the main clutch train. Gear 362 also drives a gear 361 on shaft 595 upon which is positioned the restore clutch 700. The shaft 595 rotates whenever the motor operates.

Setting clutch

The present machine employs a setting clutch and mechanism driven thereby to effect various operations incident to the commencement of a calculation under the power of the motor.

Operation of the setting clutch 430 (Figure 13) is under the control of the machine operator, particularly through the instrumentality of various operation control keys. The control of the clutch 430 is such that, immediately upon depression of one of said keys, the clutch is engaged, clutch dog 394 being raised to release the clutch, start the motor, and permit shaft 431 to be driven. Normally, however, the clutch dog 394, which is freely supported on shaft 501, is held in engagement with the clutch by spring 502.

To permit operation of the setting clutch by the control mechanism hereinafter described, an operating bar 503 is provided which is adapted to be operated thereby. Bar 503 is supported on the right side of a frame plate by means of levers 504 and 505 pivoted to the plate at 506 and 507, respectively, and to the bar at 508 and 509, respectively, and is normally held in raised position by spring 510 tensioned between the lower end of lever 504 and shaft 822.

So that lowering of the bar 503 may lift the clutch dog 394, a bell crank 512 is pivoted to the lever 505 at 513, and is provided with a notched arm 514 which overlies a lateral extension 515 on clutch dog 394 when the bell crank is in the position in which it is normally held by a spring 516 tensioned between the other arm of the bell crank and bar 503.

To limit operation of the setting clutch 430 to a single cycle, since this is all that is required to operate the mechanisms actuated by clutch 430, means are provided for returning the clutch dog 394 to cause disengagement of the clutch after half a revolution of the clutch and shaft 431, even though the control key initiating operation of the clutch 430 is held in depressed position. This is accomplished by releasing the clutch dog 394 from hooked arm 514 so that the spring 502 may move the clutch dog to contact the clutch 430, and enter one of the notches therein.

The mechanism for effecting this operation includes a cam 517 (Figure 14) on the setting clutch shaft 431, which is engaged by a roller 518 on the rocking lever 519 pinned to shaft 501. A bell crank 520 (Figure 13) is also pinned to shaft 501 and is provided with a lateral projection 521 at its forward end which may engage the arm 514 and rock the bell crank 512 against the tension of spring 516, about pin 513, to release the lateral projection 515 of the clutch dog 394.

Immediately upon operation of clutch dog 394 by arm 514, engagement of clutch 430 ensues and shaft 431 is rotated. Cam 517 thereupon rotates and moves projection 521 to engage hooked arm 512 and release the clutch dog 394, which, under the tension of spring 502 is urged to stop the clutch 430 and the shaft 431 upon completion of half a revolution. Spring 522 tensioned between bell crank 520 and the frame, urges shaft 501 clockwise and keeps roller 518 against cam 517.

The setting clutch, under the control of the operation control keys of the machine, operates the previously described power set selection and locking system, and effects the dipping of the accumulator carriage. The main clutch, for driving the actuator, is engaged by means driven by the setting clutch, the two clutches being interlocked so that another setting clutch operation can not be initiated during operation of the main clutch.

For these purposes, the setting clutch controls the operation of shaft 431. Upon this shaft are mounted in succession from left to right, a series of cams including the first dipping mechanism cams, the first set of selection lock gate cams, the several selection setting cams, of which three sets are usually employed, another set of selection lock gate cams, the second dipping mechanism cams; and, the main reverse cams, the setting clutch proper, the restore clutch conditioning cam, and the main clutch starting cam at the end of the shaft.

*Main reverse unit*

For reversing the direction of drive of the elements driven by the main clutch, particularly the direction of rotation of the half, quarter, and twelfth speed shafts, as well as the drive to the counter actuator, a selectively settable drive reversing unit is provided, the construction of which is described in detail in the above identified Avery application.

Subtraction operations are accomplished by reversing the direction of rotation of the half, quarter, and twelfth speed shafts. Means actuated by the setting clutch are therefore provided (Figure 17) which may condition the main drive for reverse operation automatically by operation of the setting clutch 430.

A pendular lever 545 is capable of being acted upon by various control means and operating means to cause actuation of the reverse unit and change its setting. The pendular lever 545 is hinged on stub shaft 546, and a reverse unit controlling bar 547 is hinged thereon and supported by a link 548 having a bifurcated end slidable about setting clutch dog shaft 501. The reverse unit control bar 547 has an upturned end 549 underlying the reverse control unit 469 which is hinged on shaft 386 so that whenever shaft 431 is rotated by the setting clutch, and cams 550 and 551 rock plate 552, shelf 553 will engage and raise the reverse control bar 547 to bring the upper face of its upturned end 549 into contact with one or the other of cross-ties 554 and 555 (Figure 17) on the reverse control unit 469.

The reverse control unit 469 includes a portion 556 having a radial slot 557 therein through which shaft 558 extends, and a spring pressed pawl 559 is hinged on the plate to releasably retain the control unit with the pawl on one side or the other of shaft 558, after it has been set by movement of reverse bar 547. Spring 560, as shown in Figure 17, is normally effective to position lever 547 in its rearward position so that it will be raised by cams 550 and 551, upon rotation of the setting clutch 430 and shaft 431, to engage cross tie 555. The reverse clutch is thereupon conditioned by control unit 469 to drive the calculating mechanism in the adding direction.

If the pendular lever 545 is moved to draw reverse bar 547 forward, by any of the controls such as the division controls, or any of the minus setting mechanisms, the upturned end 549 of lever 547 is placed beneath cross-tie 554 so that, when the cams 550 and 551 are rotated, the reverse control unit 469 conditions reverse unit to drive the calculating mechanism in the subtractive direction. The pawl 559 retains the control unit 469 in position between operations of the setting clutch.

*Carriage dipping*

After selection has been made of the values to be entered into the machine, entry of the values into the accumulator is effected so that the values may appear on the dial faces 279 in alignment with sight openings 318.

As previously described, the accumulator includes (Figures 8 and 15) a series of plates 266 connected by a common bail 269 and supported for a dipping movement by shaft 262. After selection, plates 266 are rocked about shaft 262 to bring gear 271 in each order into contact with intermediate gear 189 (Figures 5A and 15) keyed to sleeve 169 together with gears 171, 177, and 183. This group of gears 171, 177, 183, and 189, being keyed to a common sleeve 169 in each order, are rotated as a body at a certain speed and for a certain distance according to the value selected, as has been described in detail in the above identified Avery application. Dipping of the carriage also results in the release of gears 271 from the braking action of pawls 319, each pawl being carried down into engagement with a shaft 565 (Figures 5 and 15), whereby the pawls are rocked clockwise to release gears 271.

Meshing of intermediate gear 271 with gear 189 in each order, results in the selected value being placed in the accumulator by rotation of gears 189. To secure dipping of the carriage at the correct cyclic time, means operated by the setting clutch are provided for dipping the carriage and thus permitting transfer of the value selected.

The means for dipping the carriage, from that position in which it appears in Figures 2, 6, 7, 8, 9, and 15, to bring gears 271 into mesh with gears 189 and then elevate the carriage at completion of the calculation, comprise two vertical sliding links 566 (Figure 15) slidable over pins 567 on opposite sides of the machine. Each link is provided with rollers 568 engaging bail 269, the links being biased upwardly by a spring 569. Links 566 are hinged to cam levers 570 and 571 by eccentric studs 572 so as to provide for adjustment of the mesh between gears 271 and 189. The cam levers carry rollers 573 in engagement with cams 574 on shaft 431 so that the links 566 are positively pulled down by the setting clutch rotation.

Means are provided for latching the carriage in raised position when the accumulator is not in operation and during shifting or clearing operations, and for latching the carriage in its lower position during engagement of gears 271 and 189. This means includes a latch lever 575 in the form of a bell crank pivoted at 576 and having a nose 577 formed at the upper end thereof to engage the lower edge of lateral extensions 578 on cam levers 570 and 571. The latch levers are urged to engage the extensions 578 by spring 579, and are normally effective to maintain the carriage in its raised position.

To disengage the latch levers 575 and permit lowering of the carriage upon beginning of a setting clutch operation, as well as to latch the carriage in its lower position, means are provided to move levers 575 and so rock their noses 577 out of engagement with the lower faces of extensions 578, and back into engagement with the upper faces thereof. A lever 580 is secured to shaft 581 (Fig. 17) in position to be engaged by an extension 582 on rock lever 552, so that rocking of plate 552 by reverse cams 550 and 551 also rocks shaft 581, to which rocking arms 583 and 584 are attached (Figure 15). Arm 583 is connected to levers 575 by pivotal connections 585 so that when they are thus rocked, the links 566 are not held by noses 577, and cams 574 may then lower the carriage. As the carriage reaches its down position, cams 550 and 551, by rocking plate 552 and arm 580 permit springs 579 to pull the latch levers counter-clockwise to re-engage extensions 578.

Rocking of shaft 202 to release pawls 201 from the blocking of gears 189 is accomplished in time with the dipping of the carriage so that release of the gears 189 is properly coordinated with the lowering of the carriage and the meshing of gears 271 with gears 189. Keyed to the shaft 202 on each side of the machine are depending levers 586 slotted to receive pins 587. The rocking cam lever 570 at the right hand side of the machine, looking from the front, includes an integral extension 588 which carries one pin 587 while, at the left hand side of the machine the lever 571 has an extension 589 carrying a similar pin 587. As appears in Figure 15, the members 588 and 589 are of different shapes because of the necessity of getting in and around certain other operating parts which might otherwise interfere.

When the setting clutch rotates the cam 574 to rock the cam levers 570 and 571, the pawls 201 are thus released, except in those orders in which a zero has been set up, as has been previously explained.

Movement of latch lever 575 is effected under the control of the described mechanism, and means are provided for releasing the latch lever 575 at the end of main clutch operation. These include (Figure 16) lever 584 secured to shaft 581, as are levers 580 and 583, so that the three move in unison. Hung on shaft 590 is a lever 591, one end of which is provided with an extension 592 lying against lever 584 and having a portion in engagement with cam 593 keyed to a sleeve 594 rotatably mounted on shaft 595. This sleeve is driven by a separate clutch 700 operated only as an incident to the termination of operations, and known as the "restore clutch."

When the main clutch dog 395 (Figure 19) is moved to stop and release main clutch 428 and open the motor circuit, as will be described hereinafter, the restore clutch starts operation and cam 593 is rotated. This rocks lever 591 clockwise to move lever 584 and so rocks levers 575 to release the latched-down carriage through the rocking of the levers 575 by levers 583 and pivotal connections 585.

The sleeve 594 carries another cam 596 (Figure 15) which is employed to prevent the carriage from rising too rapidly. Lever 597 hinged on shaft 598, bears against this cam and against a lever 599 keyed to a shaft 600. Lever 601 is also keyed to this shaft and is joined by a pin and slot connection 602 to one of the links 566 so that the rate of rise of the carriage under the pull of springs 569 is no greater than that permitted by cam 596.

*Main clutch opening*

The main clutch is engaged and its operation initiated by the setting clutch. Thus, when any one of the operation control keys is depressed, and the setting clutch started in operation, as has been previously described, the main clutch is automatically engaged, upon operation of the setting clutch, and may be held engaged for one or more cycles of operation, depending on the operation called for by the key depressed.

The main clutch structure has been described in detail in the above identified Avery application. The main clutch 428 is fixed to a rotatable sleeve mounted on the fixed shaft 429 which is positioned between frame plates 524 and 610 of the machine (Figure 12). The clutch is controlled by clutch dog 395 (Figure 14) mounted on stub shaft 611 and urged into engagement with the main clutch by spring 612a, tensioned between the left end of the dog and the frame.

A rocking lever 519 is pinned to shaft 591 and carries a roller 518 in engagement with the cam 517 carried by the setting clutch shaft 431 (Figure 14). The rocking lever carries a member 612 hinged thereon and urged to rock clockwise with respect to the rocking lever by spring 613, movement between the lever and member being limited by a pin 614 on the lever lying within a notch on the member 612. The member 612 is provided with a nose 615 which may engage a notch 616 on clutch dog 395 with a hooking action to prevent disengagement of these two parts. The push of member 612 against the dog serves to raise said dog toward the end of the half rotation of setting clutch shaft 431, the dog being rocked clockwise, and engagement of the main clutch 428 follows. Further rotation of cam 517 permits return of the rocking lever to the position shown in Figure 14 and permits clutch dog 395 to contact with and stop the clutch when it is freed from the holding means, hereinafter described, which can selectively lock the dog out of clutch engaging position for a plurality of cycles. The hinging of member 612 to the rocking lever 519 permits the setting clutch to operate without opening the main clutch in certain phases of the division operation as hereinafter described.

Main clutch control

To insure proper engagement of the main clutch, , temporary retaining means are provided for locking the clutch dog out of engagement with the clutch during the first portion of the first cycle of its operation. This means comprises bell crank 625 (Figure 14) pivotally mounted on shaft 626 and urged by spring 627 to engage lateral projection 620 on the main clutch dog 395. The bell crank 625 includes a notch 628 which engages lateral projection 620 and retains the clutch dog 395 in clutch opening position upon the very first movement of the clutch dog by the setting clutch. During the first rotation of the main clutch, cam follower 629 is rocked about shaft 611 by a cam 630 on the main clutch shaft 429, so that the pin 631 on the cam follower rocks the bell crank 625 and the shaft 626 and releases the main clutch dog.

An additional latch is provided, however, whereby the main clutch dog may be latched free of the clutch for any selected number of cycles, and comprises an arm 632 (Figure 14) and bell crank 633 pinned to shaft 626 and urged in a clockwise direction by spring 634 tensioned between bell crank 633 and the frame. When the machine is at rest and bar 503 is in raised position, arm 632 is held by projection 622 on bar 503. Downward movement of bar 503 is accompanied by movement thereof to the right and permits lever 632 to rock clockwise so that shaft 626 is rotated by the said spring 634. The bell crank 633 includes a notch, a roller 635 being provided adjacent one face of the notch which may engage lateral projection 620 on the main clutch dog and latch the main clutch dog to slide off it easily and quickly when the end of the clutch operation has been determined, and holds the main clutch dog slightly lower than does notch 628 so that after lever 625 is once released it can not reengage the main clutch dog and the dog is thus left free to drop home as soon as bell crank 633 is released.

If the bell crank 633 has not moved into position to engage the lateral extension 620, then the clutch dog can move to engage the clutch and stop it after a single cycle of operation. Lever 633 is latched from engaging the main clutch dog except when multicyclic operations of the main clutch are called for. As will presently appear, particularly during division operations, a lever 2050 (Figure 22) is hung from a shaft 2004 and is biased in a clockwise direction by a spring so as to overlie the tail of a lever 2051, also keyed upon the shaft 626. Except when multicyclic operations of the main clutch occur as called for, a shelf 2053 on the lever 2050 overlies the tail of lever 2051 and prevents clockwise rocking of shaft 626 so that lever 633 is prevented from engaging the extension 620 of the main clutch dog. However, if the bell crank 633 is permitted to rock, it will engage the lateral extension 620 and will retain the clutch dog in clutch open position so that further rotation of the main clutch will occur as has been predetermined.

The main clutch is thus operatively closed and engaged to drive as long as the operation control is effective, after which spring 510 returns bar 503 and pulls lever 632 in a counter-clockwise direction. Shaft 626 is thus rocked and bell crank 633 rocked to release the extension 620 of the main clutch dog which contacts, stops, and disengages the clutch.

Restore clutch

The restore clutch 700 (Figure 19) is employed to effect the release of the carriage latch members 575 and to control the rate of the return of the carriage from its dipped position, as well as certain functions hereinafter described in connection with division operations. This clutch is jointly controlled by the dipping carriage and by the main clutch dog, in such a way that whenever the carriage is in its lower position and the main clutch dog 395 is seated home in the notch of the main clutch, the restore clutch will open and complete one cycle of operation.

The lowering of the carriage creates a spring bias tending to move the clutch release dog away from the restore clutch and permit engagement of the restore clutch, but as the dog is latched by a member 701 during operation of the main clutch, the spring is prevented from becoming effective until completion of the main clutch cycle. The raising of the carriage is initiated and controlled by the restore clutch and this carriage movement is utilized to reverse the spring bias on the restore clutch release dog so as to tend to return it home so that as the restore clutch cycle is flinished, the clutch release dog is spring pressed into the full cycle notch of the clutch housing, bringing the restore clutch to rest upon the completion of one cycle of operation.

The clutch particularly employed is similar to that disclosed in the patent to Friden, Number 1,643,710. This clutch, which is mounted upon and driven by shaft 595 (Figures 15 and 20) is directly controlled by an extending nose 702 on a clutch release dog in the form of a bell crank 405 which is freely supported on the shaft 600 (see also Figure 15). For controlling the clutch release dog, an M-shaped member 703 is provided which has one foot rotatably mounted on the shaft 600, and a lug 704 thereon, supporting a spring 705 compressed between itself and the left arm of a bell crank or dog 405 carrying the nose 702.

An arm 722 keyed to the shaft 600, and thus rocked by dipping movement of the carriage, is resiliently connected to the M-shaped member 703 by a link unit 723 shown in detail in Figure 18. As appears in this figure, the link structure includes a first link member 706 secured by pin 708 to the arm 722, and another link 711 secured by pin 712 to the M-shaped member 703, the other ends of each link being slotted as at 713 to receive either the pin 709 or 712. Each link has a cut out portion into which two tenons 714 and 715 extend, the respective tenons being of different lengths so that a common support is provided for the spring 716, slipped over the adjacent tenons in each link, so that when the unit is pulled apart, the spring is compressed. Likewise, when the overall length of the unit is reduced, the spring is also compressed so that the spring tends to maintain the link at a given and constant length while being continuously supported by the overlapping tenons.

As the setting clutch rotates, the main clutch dog 395 is withdrawn from contact with the main clutch and an extension 409 on said dog is withdrawn from beneath a latch member 701 pivoted on a frame plate, thus permitting said latch member to be rocked counter-clockwise by its spring 717 tensioned between one end thereof and the frame. A lateral extension 718 on said latch member is thereby brought beneath the face 719 of the M-shaped member 703 to prevent the lowering of the carriage, which ensues immediately, from rocking the restore clutch dog 405. The foot of M-member 703 is provided with a shelf 720 overlying one end of a bell crank 721 which is rotatably supported on shaft 611. The other end of bell crank 721 is provided with a roller 707 lying against the periphery of a cam 708 on the setting clutch shaft 431. On rotation of the setting clutch, the bell crank 721 is rocked and shelf 720 is raised by the end of the bell crank to rock the M-shaped member 703 slightly clockwise about the shaft 600. This raising of the member 703 not only insures that the lug 718 of the latch member 701 will engage under the face 719 properly when the main clutch is engaged, but provides for the situation, occurring in certain division operations, when operation of the setting clutch does not cause engagement of the main clutch. In this situation the latch member 701 is not permitted to rock and the cam 708 serves to delay operation of the restore clutch until near the end of the setting clutch cycle. The reason for this delay will appear in the description of the division mechanism hereinafter.

As the setting clutch continues to rotate, the dipping carriage is lowered an shaft 600 is rocked counter-clockwise by arms 601 (see also Figure 15) keyed thereto and connected with the carriage lowering links 566. Arm 722 (Figure 19) keyed to the shaft 600, is thus lowered, and since the M-shaped member 703 is held by the latch member 701, the link unit 723 is lengthened and its spring 716 compressed.

The parts remain so positioned until the main clutch dog 395 is permitted to reseat in the notches of the clutch discs, whereupon the extension 409 strikes the lateral projection 718a of the latch member 701, rocking it clockwise and removing its lug 718 from under the face 719 of member 703. Spring 716 is then permitted to expand, shortening the link unit 723 and rocking the member 703 counter-lockwise to correspondingly move the restore clutch dog 405 through its contact with lug 724 on said member 703.

Operation of the restore clutch thus initiated, causes the dipping carriage to rise, as previously described, rocking arm 722 clockwise by virtue of its connection therewith. Movement of the arm 722 is, in this operation, transmitted directly through the link unit 723 to rock member 703 clockwise, and to compress spring 716 until the nose 702 of the restore clutch dog 405 can re-enter the aperture of the housing to disconnect the clutch, whereupon the mechanisms are brought to rest in the position shown in Figure 19.

Division

The machine, in connection with which the present invention is described, includes improved control devices for automatically performing problems in division, but the invention is also applicable to machines utilizing other types of division controls. In division operations the dividend is set up in the accumulator, the divisor is set up on the keyboard, and the automatic division key is depressed. The machine thereupon carries out automatically the operation of dividing the divisor into the dividend and registering the quotient in the counter 1801, the carriage being automatically shifted after registration of each quotient digit successively. The operation consists of successive subtractions of the divisor from those digits of the dividend which are registered in orders of the carriage aligned with the actuating mechanism, and which may be called the "effective dividend." As the carriage is automatically shifted to the left, additional dividend digits are successively brought into alignment with the actuating mechanism until the carriage reaches its leftward limit.

In performing such an operation it is necessary to shift the carriage when the aforementioned subtractions have reduced the effective dividend to a value below that of the divisor. Other machines do this automatically by utilizing the overdraft registration of nines across the accumulator to initiate, first a corrective addition cycle, and then a carriage shifting operation. The machine disclosed herein, however, provides mechanism for mechanically comparing the dividend and divisor and utilizing the indication of their relative magnitude, thus secured, to select the proper ensuing operation. All overdrafts, which have heretofore been necessary only for control purposes, can theoretically be eliminated by the use of such a mechanism, but in practice it is not practicable to set the controls to such a fine adjustment and some overdrafts do occur. These are, however, properly corrected by the mechanism provided.

Keyboard controlled mechanism

It will be recalled, from the description of the accumulator mechanism of the present machine, that when the carriage is dipped to bring the accumulator in position for operation by the actuating mechanism, the numerals registered may be moved out of alignment with the sight openings since each accumulator element assumes a position indicating not only the value registered on itself, but is also moved ahead to indicate such partial increments of an additional unit as have been transmitted to it from lower orders by the entrained carry mechanism. It is therefore necessary to provide mechanism for forming a similar representation of the divisor value in the decimal orders selected for effecting control of the operation.

The mechanism for forming a representation of the divisor value comprises levers 900 (Figure 29) carrying sensing shelves 901 and pivotally supported at 902 on bell cranks 903 which are adjustable so as to permit the pivots 902 to be raised and lowered for the purpose of differentially positioning said pivots in accordance with values set on the keyboard.

The pivots 902 of levers 900 are adapted to be proportionately positioned, under control of the manually set selection mechanism of a plurality of keyboard orders. Except in the orders which are blocked out of operation as hereinafter described, each pivot 902 is positioned so as to form a mechanical representation of the value set up in its related order plus one-tenth of the value set up in the next order to the right thereof. It is unnecessary to transmit partial increments to each pivot 902 from keyboard orders below the next adjacent order, and no provision for it is therefore disclosed.

Each sensing lever 900 being pivotally supported by pin 902 on the above mentioned bell crank member 903, is urged to rock counter-clockwise by a spring 904 tensioned between member 903 and a stud 900a on the sensing lever 900. The lever 900 includes a stop lug 905 which overlies and engages member 903 to limit the movement of the lever 900 and has a blocking tail 906 which may be positioned to permit a gate or bail 907 to rock in a counter-clockwise direction and prevent further actuation or to block the gate from rocking and thus have the machine operation continue, as will presently appear.

Bell cranks 903 are pivotally supported, in each order, between adjacent brace plates 142, as appears in Figures 29 and 30, and include a bridge 913. Upon an extension 914 of each bridge is fixed a small sleeve 915 having a pin 916 slidably positioned therein and enclosing a spring 917a adapted to push the pin to the left, engaging head 916a on the pin with the end of the sleeve to limit the travel of the pin. The pin of each order extends through a hole in each brace plate into the bell crank member 903 of the next higher order to support both the bell crank member upon which it is carried and the corresponding bell crank member in the next higher order.

Bell crank member 903 and lever 900 may be rocked as a unit about the pivot provided by pins 916 by lever 917 freely mounted on shaft 137 and carrying a pin 918 projecting into an open slot 919 in the member 903. Pivotally mounted on lever 917 (Figure 28) is a second lever 921 having an offset portion 922 adapted to bear against the end of an extension 923 on the adjacent selection segment 132. Another offset portion 924 on the opposite arm of lever 921 is adapted to bear against an extension 925 of an adjacent lower order selection segment 132. The two arms of lever 922 are so proportioned, and their bearing points on the two segments are so located, that movement of the lower order segment will transmit only one-tenth as much movement to the supporting lever 917 as will corresponding movement of the upper order segment. By this arrangement, the pivot 902 of a lever 900 may be raised about pivot pins 916 a number of increments corresponding to the setting of the adjacent selection segment 132, plus an additional fraction of an increment decimally proportionate to the setting of the adjacent lower order selection segment.

To avoid undue loading of the key section, since the keys move the selection segments 132 directly, it is not desirable to move the members 921, 917, 903 and 900 by the depression of keys, and since it is also necessary to keep the sensing shelves 901 out of range of possible interference with carriage elements except during certain portions of the division operation, mechanism is provided for normally maintaining all levers 921 raised beyond the furthest points reached by selection segment extensions 923 and 925 and for maintaining all levers 900 lowered sufficiently to avoid the possibility of contact with any carriage parts.

This is accomplished by mechanism including a plurality of levers 930 loosely keyed upon shaft 931 (Figures 29 and 31). Each of these levers is provided with fingers 932 and 933 adapted to cooperate with a lateral extension 934 on lever 917. When the machine is not operating in division, and even in division, until the setting clutch has started its cycle, the fingers 932 of members 930 are retained in engagement with these extensions and hold levers 917 rocked counter-clockwise about shaft 137 in the position shown in Figure 31. This carries levers 922 sufficiently clear of selection segment extensions 923 and 925, and rocks bell crank members 903 counter-clockwise about their pivots 916 so that the levers 900 thereon are pressed against the underside of cross rod 935 and rocked clockwise against the tension of springs 904 to lower the sensing shelves 901 sufficiently.

Throughout division, the sensing shelves 901 associated with lower orders than the highest order in which a divisor digit has been set up are blocked out of operation in the same manner as just described and are not permitted to rise sufficiently beyond the position in which they are held prior to the start of division, to bring them into cooperative relation with members 1040. Connected by a separate sleeve 936 (Figures 29 and 31) with each of the members 930, is a member 937 having a shelf 938 adapted to cooperate with a lug 939 on selection segment 132 of the adjacent higher order so that if the segment 132 of that order is advanced out of the zero position in which it is shown in Figure 29, the lug will overlie the shelf and prevent spring 931a from rocking the member 937 with shaft 931, the loose keyway permitting its retention in this manner.

If one lever 930 is so blocked, all those to the right of it will be similarly blocked even though zeros are set therein, since lugs 940 on each lever 930 overlie each member 937 to the right, as is clearly shown in Figure 31, and all sleeves 936 to the right of a blocked sleeve are prevented from rocking in this manner.

From the foregoing it can be seen that when a divisor is set up on the keyboard and the shaft 931 is rocked counter-clockwise, the following positioning of parts described will be assumed:

1. The extension 925 of the selection segment on which the left-most, or highest digit of the divisor is set up will cause the pivot 902 of the sensing lever 900 associated with the next higher order to be positioned a fraction of an increment above its zero position said fraction depending upon the value of the digit set up in that keyboard order alone;

2. The pivots 902 of sensing levers 900 associated with all higher orders will each assume a zero position;

3. The extension 923 of the previously mentioned selection segment, and the extension 925 of the next lower selection segment will jointly cause the pivot 902 of lever 900 associated with the order in which the leftmost or highest digit of the divisor is set up to be positioned so as to mechanically represent the actual value of said highest digit and the next lower digit in their proper decimal relation of ten to one;

4. The sensing shelves 901 of all orders below that order in which the highest digit of the divisor is set up will be blocked out of operation.

*The division control gate*

When the divisor is set up in the keyboard and the shaft 931 is rocked counter-clockwise to enable certain of the sensing levers 900 to come into sensing position, the sensing shelf 901 in the order containing the highest digit of the divisor and the sensing shelf in the next higher order effect control of the gate 907 in accordance with the positioning thereof by the accumulator mechanism as will appear hereinafter. This gate is mounted for a swinging movement about pins 942 (Figures 23 and 29) and extends across the machine with a finger 943 (see also Figure 31) extending rearwardly in each order between bell cranks 903 and cooperating with adjacent blocking tails 906. Before shaft 931 is rocked, the gate is held rocked clockwise away from the blocking tails and out of a controlling position. For a short perior after shaft 931 is rocked, the gate is held before being released. When the gate is released it is pulled counter-clockwise by spring 944 until it engages one of the blocking tails 906 or, if it does not engage any tail, rocks through to that position shown in Figure 29 wherein it is effective to stop or prevent main clutch operation and actuation of the accumulator. However, so long as the gate is in engagement with a single blocking tail 906 and is prevented thereby from assuming that position shown in Figure 29, the main clutch will operate.

The fingers 943 which engage the blocking tails 906 are each slightly shorter than the finger in the next order to the left. A blocking tail in one order may therefore release the gate but the gate may only swing slightly before it engages the tail in the next lower order. The tail in that order may then block the gate from swinging through and so permits main clutch operation to continue.

The cooperation of the shelves 901, in the order to the left of the first value order, and in the first value order, with the accumulator mechanism, will be described presently.

The gate 907 controls operation of the main clutch. A lever 2117, pivoted coaxially with the gate, has a lug extending into the path of movement of the gate and is (Figure 23) connected by slot and pin connection to lever 2118 which is secured on shaft 2119. Rocking of shaft 2119 is effective to rock bell crank 2073 thereon (Figure 14), which has one arm adapted to contact with a lug on arm 633 fixed to shaft 626 and rock the shaft counter-clockwise to release the main clutch dog 395 from restraint of the multicycle latch 635, stopping the actuator. A second arm of the bell crank 2073 is adapted to contact with a lug 945 on the main clutch engaging interponent 612 and rock the interponent counter-clockwise to prevent its extension 615 from engaging the hook 616 of the main clutch dog 395. This prevents engagement of the main clutch by the setting clutch, unless the gate 907 is restrained by a blocking tail 906.

Initiation of division operation

The operation of the machine to perform a division calculation is initiated by depression of division key 970. This key, when depressed, is latched down and causes engagement of the setting clutch, conditioning of the reverse unit to ensure negative actuation of the main actuator, and rocking of shaft 931.

The division key 970 is mounted upon a key stem 971 which is supported by parallel links 972 and 973 (Figure 22) upon a frame plate in the control unit. The key stem 971 carries a roller 974 which lies in front of division control member 975 (see also Figures 21 and 32). Member 975 is rotatably mounted upon shaft 976 and is urged clockwise by a strong spring 977. When the division key is depressed, the roller 974 passes beneath face 978 on the member 975 and spring 977 rocks the member 975 clockwise until upper roller 979 thereon contacts the main operating bar 503 (see also Figure 13) and depresses said bar to rock the setting clutch dog 394, as has been previously explained. When the key is first depressed, extension 980 (Figure 22) on link 973 is brought into notch 981 on latch 982 and is held in the notch by the pull of spring 983 on arm 984, integral with 982, until the stop key 985 is depressed or until the last order is reached, as will appear.

The main reverse unit, previously referred to, is also conditioned, upon depression of the division key, to insure negative operation of the main actuator. In Figure 21, a bell crank 986 is shown mounted for hinged movement about stud 987. When the division control member 975 is released and rocks clockwise, the roller 979 is brought into engagement with the lower arm of bell crank 986 to rock it in a counter-clockwise direction. Bell crank 986 includes an extension 988 which overlies extension 989 (Figure 17) on pendular lever 545, and this rocking of the bell crank 986 thus rocks the pendular lever in a clockwise direction to condition the reverse unit for negative operation if it is not already so set, as has been previously explained.

Rocking of the shaft 931 (Figure 31) and the levers 930 and 937 thereon, is effected under the control of the mechanism particularly shown in Figures 23 to 27, inclusive. As there appears, a member 990 is fixedly keyed to the shaft 931 (Figures 25 and 26) while another member 991 (Figures 26 and 27) is loose upon the shaft. A latch member 992 is pivotally mounted on the frame at 993 and is urged by spring 1994 into engagement with an ear 995 on member 990 so as to prevent premature counter-clockwise movement of shaft 931 to which the member 990 is keyed. These members also include extensions 997 and 998 respectively, for cooperation with a T-shaped member 999, supported from a rocking lever 1000 (Figure 23) carried on a shaft 1001, and provided with a pin 1002 lying in a slot 1003 in cam operated lever 553. Upon rotation of main reverse cams 550 and 551 (see also Figure 17) on the setting clutch shaft, the T-member 999 is rocked down and then up. Depending upon the position of the T-member, it may engage selectively either the extension 997 on member 990 or 998 on member 991.

The T-member is positioned by the division control member 975, this member 975 carrying a pin 1005 (see Figures 21 and 23) which extends into a slot in the end of rocking lever 1006, the lever 1006 being pivoted on a stud 994 on the right side frame. The T-member 999 carries a projection 1007 which extends into a cam slot 1008 in the lever 1006. When the division member is rocked toward the left, the T-member overlies extension 997 while, when the division member is rocked toward the right, to start a division operation, the T-member overlies extension 998. With the T-member in the latter position, rotation of the reverse conditioning cams 550 and 551, is effective to bring the T-member into engagement with the extension 998 and cause counter-clockwise rotation of the member 991. Such movement of member 991, which is freely mounted on the shaft 931, first presses a lug 1010 on said member against the latch member 992, rocking it away from the ear 995 and freeing shaft 931 for counter-clockwise movement. As the movement continues, face 1009 of member 991, presses against the opposite side of ear 995, rocking the member 990 and the shaft 931 counter-clockwise. Levers 917, 922, and 900 are thereupon released to take up those positions determined by the selected value as heretofore described, and levers 930 and 937 are permitted to assume various positions dictated by the setting of the keyboard.

Counter-clockwise rotation of shaft 931, releasing the sensing mechanism, is effective to lock the carriage against lateral shifting movement (Figure 26). Member 990 keyed on shaft 931 is provided with an extension 1012 against which spring 1013 pulls lever 1014. Lever 1014 is positioned adjacent the right hand frame plate and includes an extension 1015 which is notched to engage a carriage plate 266 and retain the carriage against shifting movement until the extension 1012 is re-rocked in a clockwise direction so that the extension 1015 assumes that position shown in full lines in Figure 26. When the sensing mechanism is released, therefore, the carriage can not be shifted until the sensing mechanism is returned to its inactive position. The gate 907 is also released by rocking of shaft 931, a lever 1016 being fixedly keyed to the end of this shaft as appears in Figure 24. When this shaft is rocked, roller 1017 on lever 1018 is moved away from gate 907, but, to ensure that the several sensing shelves and their associated parts will have sufficient time within which to arrive at the positions dictated by the keyboard setting, the gate 907 although released upon rocking of shaft 931, is temporarily held by other means until well toward the end of the setting clutch cycle and after the gears 271 and 189 have been brought into mesh by dipping of the carriage.

The several plates 214 (Figures 2 and 21) carry the shaft 213 which extends across the machine through all orders. Mounted upon a stud 1020 on the control plate frame, is a delay latch 1021 (Figures 21 and 23) which is urged in a clockwise direction by spring 1022. When plates 214 are rocked in a counter-clockwise direction, upon initial operation of the setting clutch, as has been explained in connection with selection, the end of the delay latch 1021 is released by movement of the shaft 213 and is thereupon pulled in a clockwise direction by spring 1022 to position its nose 1023 behind an offset portion 1024 of rocking lever 2118 which is fixed on shaft 2119. This prevents lever 2118 from rocking in a clockwise direction and prevents the gate 907 from rocking into operation, upon rocking of shaft 931.

At the end of the setting clutch cycle, after the carriage has been lowered by the carriage dipping mechanism (Figure 15) and gears 271 and 189 are meshed, plates 214 are rocked clockwise and the shaft 213 returns to engage the delay latch and force it counter-clockwise to release gate 907 which is then pulled counter-clockwise by spring 944 to engage one of its fingers 943 with the blocking tail 906 of the sensing lever 900 in that order of the keyboard which is in control.

Toward the end of the setting clutch cycle (assuming that the gate 907 has been restrained by a blocking tail 906), the cam 517 (Figure 14) will rock lever 519 moving the extension 615 of interponent 612 into engagement with hook 616 on the main clutch dog 395 and rocking the said clutch dog to cause transmission of power through the main clutch.

The multicycle latch 633 then engages the clutch dog 395, lever 2050 (Figure 22) having been rocked to permit it to do so, by an arm 1025 fixed to shaft 976 and rocked clockwise by depression of the division key (Figure 22) by arm 1026 also fixed to the shaft and link 1027 and lever 973 connecting said arm to the stem of the division key.

Operation of the actuator is thus initiated, and continues until the blocking tails 906 are moved to release the gate 907, or until the special stop key, hereinafter described, is operated.

*Accumulator controlled mechanism and operation*

The blocking tails 906 may be moved to release the gate 907 at the proper time, by elements of the previously described accumulator.

It will be recalled from the description of the accumulator mechanism that when the carriage is dipped to bring gears 271 (Figure 2) therein into mesh with gears 189 in the actuator for actuation, the numerals registered on the dial shells 279 may be moved out of alignment with the sight openings 318 since each accumulator element assumes an intermediate position indicating not only the value registered on itself but is also advanced such a partial increment of an additional value as has been transmitted to it from lower orders by the entrained carry mechanism. The dial shell 279 therefore, in the first order of the value set up in the accumulator, includes not only its own order value, but the decimal value of all lower values set in the accumulator.

It will also be recalled that snail cam 281 (Figure 8) moves with the dial shell and that lever 315 carries a roller 316 which may be pressed against the periphery of the cam so that the position of each lever will be a representation of the value position of its associated dial shell. This structure is used to control the release of the gate 907 at the proper stages in division operations. That is, since the heights of the pivots 902 of the controlling levers 900 are regulated in accordance with the values of the associated depressed value keys on which the divisor is set and are thereafter held at these heights throughout the negative actuation of the machine, release of the gate 907 by the controlling levers 900 so as to arrest operation of the actuator is effected by rocking the levers 900 about their pivots 902 under control of the snail cams 281 until the blocking tails 906 thereof pass above blocking relation with the fingers 943 of the gate 907.

Each roller carrier lever 315 has pivoted thereon, for limited movement for a purpose hereinafter described, a lever 1040 (Figure 29), the nose of which can engage the sensing shelf 901 in the aligned order of the keyboard if that shelf is standing in a zero position, or any position representing a value. Now, with the first five orders from the left in the accumulator reading "00024," the noses of the first two levers 1040 will stand practically at a zero cam position, the tail of the third will stand at a position corresponding to a 0.24 position on the cam 281, the fourth at a position corresponding to a 2.4 cam position, and the last at a 4.0 position.

If the first five orders, from the left, on the keyboard are set "00008" and the shaft 931 is rocked, the first three sensing shelves 901 will assume their lowermost effective position, which in practice should be about equivalent to a .5 registration; i.e., a position in which noses 1040 would just contact the shelves when the associated numeral wheels were at a .5 registration. The fourth shelf 901 will be positioned at an .8 registration by the mechanism described earlier herein, and the fifth shelf will be positioned at an 8. registration. Any remaining levers at the right will remain out of blocking relation with the gate, as previously set forth.

As the shaft 931 is rocked, the noses of the levers 1040 in the first three orders in the carriage which stand at zero registrations, will be pressed against the shelves 901 and rock levers 900 clockwise so that the tails 906 thereof will be ineffective to block the gate. However, in the fourth order, the nose of the compounding lever 1040 will stand at a 2.4 value. Since this is a greater value than the .8 represented by its co-operating and opposite shelf 901 it will not contact this shelf 901 and the blocking member in this order, termed the "tens" order, will restrain the gate and the gears 189 will drive gears 271 negatively to subtract "8" from "24."

During the first cycle of subtraction, in the foregoing example, the remainder in the accumulator will be reduced to "16," the dial in the fifth order being driven backward from "4" through "0" to "6." Since its original 4. registration was, in the first place, less than the 8. registered on the aligned keyboard order, the original rocking of the shaft 931 pressed the shelf 901 of this order against the nose of aligned lever 1040 so that the blocking tail 906 was moved out of the path of the gate 907 leaving said gate restrained by the blocking tail of the next higher order alone. As this fifth order dial passes from "0" to "9," in this first cycle, the conformation of cam 281 permits the spring 904 to raise the shelf 901 high enough to carry the blocking tail 906 into the path of the gate 907, but this is only a temporary condition, for as the dial progresses to its final 6. position, the cam 281 rocks the levers 315, 1040, and 900 to again raise the blocking tail out of the path of the gate. It should be noted, however, that the progressive shortening of the fingers 943 of the gate 907, previously referred to, permits a blocking tail to the right of one which is holding the gate, to drop into holding position at any time prior to full release of the gate.

Although the position of the lever 315 in the fourth order of the accumulator is changed from a 2.4 registration to a 1.6 registration during this first cycle, the pivot 902 of lever 900 associated with the fourth order is positioned at .8 and hence since this value is less than the 1.6 value, the lever 900 is not moved out of blocking relation with the gate. A second subtraction cycle therefore ensues.

During this second subtraction cycle, the position of the lever 315 in this fourth order of the carriage is changed from a 1.6 registration to a .8 registration equaling the .8 registration position of the associated sensing lever pivot 902, but still failing to rock the lever 900 to remove the blocking tail thereof from the path of the gate 907.

The lever 315 in the fifth order of the carriage is moved, during this second subtraction cycle, from a 6. registration downward to a 0. registration, upward to a 9. registration, and back downward to an 8. registration. The upward movement permits its associated lever 900 to move into the path of a finger 943 of the gate 907 and the subsequent downward movement is insufficient to remove it from that position, so that at the close of the cycle both the fourth and fifth beyond its 8. position blocking tails 906 lie in the path of the gate 907 and another subtraction cycle ensues.

During the very first part of the third subtraction cycle, the downward movement of the fifth lever 315 in the carriage will be sufficient to rock the associated lever 900 to remove its associated blocking tail 906 from the path of gate 907 leaving the gate held by the fourth order blocking tail alone.

The value representing positions of the fourth order pivot 902 and lever 315 were equal at the end of the second cycle, so that further lowering of the carriage lever 315 during the third cycle immediately begins to rock the lever 900. A small movement of this lever is sufficient to remove its blocking tail from the path of the gate 907 which, thus released from restraint, is pulled counter-clockwise by spring 944 rocking shaft 2119 (Figure 21) clockwise, and thereby rocking bell crank 2073 (Figure 14) to carry the multi-cyclic latch 635 away from the main clutch dog 395 and thus arrest operation of the actuator.

In order to insure proper movement of "tens order" blocking tails, a compounding tip for lever 315 is provided in lever 1040, pivotally mounted thereon. When cooperating with a sensing shelf in any registration from "two" to "nine," lever 1040 assumes a position above that shown in Figure 29. As the lever 315 reaches a position intermediate a "two" and a "one" registration, however, the tail 1041 of lever 1040 is pressed against a cross rod 268 so that upon further downward movement the lever 1040 is rocked counter-clockwise on the lever 315 and its tip describes an arc about three times as long as between other positions. When functioning as a "tens order" control lever, the throwoff is always between "one" and "zero" and the compounding lever 1040, by magnifying the movement of lever 315 insures the accurate functioning of this control.

Rocking of the main clutch dog 395 by its spring 612 initiates operation of the restore clutch 700 in the manner previously described. Certain additional functions are performed under control of this clutch in division operations.

During the restore clutch cycle the dipping carriage is raised, and a link 846 (Figure 20) is moved to the left by cam 849 rotated by the restore clutch 700, thus rocking lever 847 counter-clockwise about its pivot 876. This operation rocks the division control member 975 counterclockwise by an arrangement comprising a bell crank 1042 pivotally mounted on lever 847 and having a notched end adapted to engage a lateral extension 1043 on the member 975. A second bell crank 1044 is freely mounted on shaft 876 and has one arm provided with a slot embracing a pin 1046 on the bell crank 1042. A spring 1045 tensioned between the other arm of bell crank 1044 and the frame, holds the bell crank 1042 in position to engage the extension 1043 during the first part of the movement of cam 849, but causes the bell crank 1042 to be rocked so as to override and miss the extension 1043 when the member 975 is in the position shown in Figure 20 when the cam operates. The above mentioned counter-clockwise movement of the member 975 carries its pin 1005 (Figure 23) to the right, rocking lever 1006 and, through lug 1007, the member 999, so that the T-shaped head of the latter overlies the lug 997 of member 990 (see also Figure 26) keyed to shaft 931.

The division member 975 is retained in its leftward position by latch lever 1050 (Figure 21) which is urged by spring 1051 to engage extension 1052 on the division member. The division control member remains latched in this position during the remainder of the division operation in that order.

Return of the division member 975 is effective to set the reverse unit for positive actuation, and open the setting clutch for another cycle of operation. Division member 975 carries a link 1054 which is provided with a notch 1055 which, upon the first forward movement of the division member, is pulled into engagement with extension 1056 on a bell crank 1057 (Figure 21) by a spring 1058a. Upon return of the division member, the bell crank 1057 is rocked in a clockwise direction so that the extension 1058 thereon presses down upon the main operating bar, as appears in Figure 13, to start a second setting clutch cycle. The bell crank 1057 also carries a roller 1058 which, upon clockwise rotation of the bell crank engages the pendular lever 545 (Figure 17) and rocks the link 547 to set the reverse unit for positive operation of the actuator by the main clutch. Movement of the link 846 by the cam 849 also rocks the gate 907 so that it may be relatched by the blocking tails if an overdraft has rendered the value registered by the accumulator greater than that set up on the keyboard. For this purpose link 846 is provided with an extension 1060 adapted to rock an arm 1061 pinned to shaft 2119 and thus to rock the gate 907 (Figure 20) through levers 2117 and 2118. If the gate is not latched by the blocking tails, however, it will rock back as soon as the cam 849 permits it to do so, at the end of the restore clutch cycle.

As the restore clutch cycle terminates, the gate 907 is released unless it is held by the blocking tails, and is free to rock forward under the pull of springs 944. If the gate can pass through, as in the foregoing problem where there was no overdraft, bell crank 2073 is rocked and interponent 612 is moved by the initial rise of cam 517 (Figure 14) so that it will pass beneath and miss the main clutch dog and main clutch actuation will not occur. If the gate is blocked, however, a main clutch actuation follows. The main clutch actuation, controlled by disengagement of the main clutch dog from the main clutch, depends upon whether or not an overdraft has occurred, for if an overdraft has taken place, it is necessary that a positive operation follow.

The initial small rise of the main clutch opening cam 517 (Figure 14), either hooks the extension 615 of the interponent 612 into the hook 616 of the main clutch dog 395 or else carries the extension under the hook so that operation of the dog can not take place. As the setting clutch cycle proceeds, the main reverse cam lever 552 (Figure 17) not only sets the reverse unit for positive rotation, but also rocks lever 1000 (Figure 23) lowering member 999 which engages lug 997 and rocks shaft 931 to restore the sensing shelves 901 to the position in which they are shown in Figure 31 in which position they are lowered out of contact with the carriage elements. The shaft 931 is held in this position by the latch 992. Rocking of the member 990 also brings its arm 1012 (Figure 26) against lever 1014 raising its extension 1015 out of locking relation with the carriage so as to permit a shifting operation.

In any event it is necessary that the corrective positive actuation, if initiated, be limited to a single cycle of operation. During the setting clutch cycle, shaft 501 (Figure 14) is rocked by cam 517 rocking bell crank 520 (Figure 21) pinned to the shaft 501. By means of a lateral extension 521 on one arm of the bell crank 520, a lever 1062 freely mounted on the shaft 976 and having an end underlying the extension 521 is rocked to bring an extension 1063 on the other arm of lever 1062 against the link 1054 lifting its notched end 1055 and releasing the bell crank 1057 which is thereupon rocked counter-clockwise by its spring 1064. This raises the lug 1058 of the bell crank 1057 away from the main operating bar 503 (Figure 13) permitting the spring 510 to raise the bar and carry its lug 622 against the arm 632 (Figure 14) pinned to the shaft 626 so as to rock the shaft and remove the multicycle latch 635 from restraining relation with the main clutch dog 395. The main clutch dog therefore arrests operation of the main clutch after a single cycle of operation, and a second restore clutch operation proceeds in the usual manner.

If such a corrective cycle is not initiated, the restore clutch will be automatically engaged toward the end of the setting clutch cycle. Since, in such an operation, the main clutch dog 395 is not removed from the position in which it is shown in Figure 19, its extension 409 prevents any engagement of the latch member 701 under the M-shaped member 703 controlling the restore clutch, and as the carriage is dipped, engagement of the restore clutch is prevented only by engagement of the cam-rocked bell crank 721 with the extension 720 of the M-shaped member. As the setting clutch cycle draws to a close, the cam 708 permits its bell crank 721 to recede from under the extension 720 and, since the latch 701 is already held released by the extension 409 of the main clutch dog 395, the tensioned link unit 723 will cause the restore clutch to be engaged immediately.

Operation of the restore clutch causes the dipping carriage to be raised and initiates an automatic carriage shifting operation through mechanism described in detail hereinafter.

*Operation of carriage shift mechanism in division*

Means are included in the machine in connection with which the present invention is disclosed, for shifting the carriage 250, either to the right or to the left. The controls for this shift include an automatic one step shift of the carriage to the left after division operation in each carriage position until the last carriage position is entered. The construction and operation of this carriage shifting mechanism has been described in detail in the above identified Avery application and a brief description of the controls therefor will be sufficient for an understanding of the present invention.

Movement of the carriage by the power driven mechanism is immediately under the control of a member 1300 (Figure 32) supported on a shaft 1301. This member is connected by a link 1374 to a lever 1375 which is rocked counter-clockwise or clockwise about shaft 1376, to move member 1300 likewise. When member 1300 is moved clockwise, extension 1302 thereon is positioned in engagement with toothed wheel 1303 whereby the carriage is shifted to the right. When member 1300 is moved counter-clockwise, member 1300 positions point 1304 in engagement with star wheel 1305 whereby the carriage is shifted to the left.

In automatic division operations, except when the carriage is in the left end position, link 1374 is moved to the left (Figure 32) to engage point 1304 with the star wheel 1305 to secure an automatic shift of the carriage one step to the left after the operation has been completed. During the second cycle of operation of the restore clutch in each carriage position, counter-clockwise movement of lever 570 (Figure 15) carries its lug 1386 against the end of link 1377 (see also Figure 32) moving link 1374, to which it is connected by member 1380, dog 1383 and lug 1384 to the left to initiate operation of the carriage shifting mechanism.

The first cycle of operation of the restore clutch in each carriage position does not initiate operation of the carriage shifting mechanism because, at that time the division control member 975 stands rocked clockwise from the position in which it is shown in Figure 32, and the roller 1065 on said member has lifted the left end of link 1374 depressing its right end below the path of movement of lug 1386. Later in the first restore clutch cycle, however, the member 975 is rocked counter-clockwise and latched in the position in which it is shown in Figure 32, as previously described, removing the roller 1065 from under link 1374 and permitting spring 1372 to rock the link until it abuts the under side of lug 1386. Subsequent dipping of the carriage by the setting clutch, preparatory to a possible correction cycle, then moves lug 1386 to the right permitting link 1374 to be rocked still further and to thus be brought into the path of the leftward movement of lug 1386 during the following cycle of operation of the restore clutch. The carriage is thus moved one step to the left bringing another digit into the "effective dividend."

Operation of the shifting mechanism, thus initiated, is automatically limited to a single cycle, and the division mechanism is automatically restarted at the end of that cycle. About the middle of the carriage shifting cycle, the floating cam 1334 (Figure 32), operated by the carriage shifting mechanism, rocks lever 1356. Bell crank 1387, pivoted on shaft 1338, has one arm adapted for engagement by a lateral extension 1066 on lever 1356 and has its other arm provided with an extension 1389 underlying both the shift control link 1374 and an extension of the division control member latch 1050. Clockwise rocking of the bell crank 1387 therefore rocks the link 1374 to depress its right end and carry it clear of lug 1386, thus permitting centralizer 1410 to disengage the shift power transmission at the end of the cycle, and also lifts the latch 1050 (see also Figure 21) freeing the division control member 975 which is thereupon rocked clockwise by its spring 977, restarting subtractive operation in the new carriage position as soon as centralizer 1410 has settled into the position in which it is shown in Figure 32 so as to carry the interlock lever 1416, attached to the centralizer by link 1418, out from under lug 1420 on the main operating bar link 505 (see also Figure 13).

*Termination of operation*

This repetitive tour of operations is repeated in each successive carriage position until the carriage reaches its leftmost position, when further operation of the carriage shifting mechanism is prevented and the machine is brought to rest. As the carriage moves into its leftmost position, projection 1570 (Figure 22) on the right carriage end plate 251 contacts the under side of the cam end 1571 of lever 1572, rocking the lever counter-clockwise against the tension of spring 1573. Another arm of lever 1572 carries a pin 1575 lying in a slot 1576 in dog 1383, so that this rocking of lever 1572 serves to lift member 1383 clear of the lug 1384 on link 1374 and breaking the connection whereby movement of dog 1386 is ordinarily transmitted to link 1374 to start the shift.

During division operations, with the carriage in its leftmost position, the division key is unlatched and permitted to rise. A third arm of lever 1572 (Figure 22) underlies a lateral extension 1067 on the upper end of a bell crank 1068 pivoted at 1069 to the division key latch 982. When the lever 1572 is rocked by the carriage, bell crank 1068 may be rocked by spring 1070 to hook its other arm around lateral extension 1056 of the bell crank 1057 (Figure 21). This bell crank, it will be recalled, is rocked by link 1054 during the first restore clutch cycle in each order for the purpose of initiating a setting clutch cycle. If the end of bell crank 1068 (Figure 22) be hooked over its extension 1056 during such rocking of the bell crank 1057, bell crank 1068 will be pulled to the left, rocking the latch member 982 counter-clockwise about its supporting shaft and releasing the lateral extension 980 of lever 973 permitting the division key 970 to be raised by its spring since member 975 (Figure 21) is concurrently removed from its position overlying roller 974 on the division key stem. As the division key rises, its roller 974 moves into blocking relationship with the face of lever 975 preventing restarting of the actuating mechanism, and then releases latch 1050 by engaging and raising the lug 1098 on latch 1050. Release of the latch 1050 by this means is desirable because it is preferred to disable the shift initiating mechanism as above described. The machine is thus completely conditioned for subsequent operations of any character.

*Interruption of division operations*

A division operation may be terminated at the conclusion of operations in any carriage position by a single depression of the stop key 985 (Figure 22), leaving the quotient digit in that order accurately registered, or terminated at once by two successive depressions of the same key, which will leave a possibly inaccurate quotient digit in the counter. This mode of operation is planned to take advantage of the instinctive action of the operator, who will naturally strike the stop key a second time if the machine fails to stop as soon as was desired when the key was first struck.

Stop key 985 is slidably supported on pins 986 and 987 in the frame and normally held in raised position by a spring 1075 tensioned between a lug 1072 on the key and the pin 986. Lug 1076 on the key overlies one arm of a bell crank 1077 freely mounted on shaft 1078, the other arm of the bell crank being pivotally attached to a link 1079, deflectably supported by a spring 1080.

A link 1081, pivotally attached to the link 1079, has a slotted end 1088 engaging a pin 1082 on arm 1083 pinned to shaft 976 so that depression of the division key 970, by rocking shaft 976, will permit spring 1080 to raise link 1079 slightly so that lug 1084 thereon will lie against tail 1085 of the latch member 982 which moves down against it as the latch is rocked into engagement with extension 980 of the lever 973.

As the link 1079 is moved to the right during the first depression of the stop key 985, the latch spring 983 overcomes the link supporting spring 1080 and the tail 1085 of the latch deflects the link so that a cam point 1086 thereon passes below the stud 1087 on the frame. As movement of the link 1079 continues, lug 1090 thereon strikes the tail 984 of the latch member 982, rocking it counter-clockwise to release the extension 980 and permitting the division key to rise slightly until its roller 974 meets the under side of the division control member 975 (see also Figure 21). The right end of link 1079, however, due to its deflection by latch tail 1085 and pin 1087, underrides and misses the lug 1092, which, during operation, is in the position indicated in dotted lines in Figure 22.

Release of the latch 982 permits the division key 870 to rise as soon as the division control member 975 has been moved to the position in which it is shown in Figure 21. This occurs during the next cycle of operation of the restore clutch, and the roller 974 on the division key stem is brought into blocking relation with member 975 preventing operative movement thereof upon its release from the latch 1050. Upon being released by latch 1050, however, the member 975 moves slightly to the right against the roller 974. The division operation is thus interrupted at the conclusion of the first shifting operation subsequent to depression of the stop key.

A second depression of the stop key, after the latch 982 has been tripped, also moves link 1079 to the right. This time, however, it is not deflected by the latch tail 1085 since the latch is held in released position due to the slight rocking of lever 973 at the time of its release. The cam point 1086 therefore passes above the frame stud 1087 and the right end of lever 1079 is brought against lug 1092 on arm 1093 pinned to shaft 826, rocking the shaft counter-clockwise.

As shown in Figure 14, the multicycle latch 833 is also fixed to shaft 826, so that movement of this shaft by the link 1079 releases the main clutch dog 820 and thus immediately arrests operation of the actuator and initiates operation of the restore clutch. The operation is then terminated.

I claim:

1. In a motor driven calculating machine having registering mechanism, settable actuating mechanism, and power transmission mechanism including a clutch and controls therefor comprising a control member movable to clutch engagement controlling position and clutch disengagement controlling position; spring means for urging said member to clutch disengagement controlling position, means for latching said member in clutch engagement controlling position, and means for automatically dividing an amount registered by said registering mechanism by an amount set into said actuating mechanism comprising a division initiating member manually adjustable to operative position; means comprising a division interrupting member manually operable at any stage of a division operation for releasing said control member from said latching means and for controlling movement of said division initiating member from said operative position.

2. In a motor driven calculating machine having registering mechanism, settable actuating mechanism, and power transmission mechanism including a main clutch and controls therefor comprising a control member movable to clutch engaging and clutch disengaging positions, spring means urging said member into clutch disengaging position and latch means for latching said member in clutch engaging position, means for automatically dividing an amount registered by said registering mechanism by an amount set into said actuating mechanism, a manually operable division interrupting member, means operable by said automatic dividing means only after a single operation of said division interrupting member for releasing said control member from said latch means, and means other than said releasing means for releasing said control member from said latch means after a second operation of said division interrupting member.

3. In a calculating machine having numeral wheels, settable actuating mechanism, and means for effecting operation of said numeral wheels by said actuating mechanism including cyclic driving means for said actuating mechanism; the combination with means for controlling said machine to automatically divide an amount set up in said numeral wheels by an amount set up in said actuating mechanism and to register a plural digit quotient including means manually operable to initiate the operation; of division interrupting controls comprising a manually operable member, means jointly controlled by said division controlling means and said member, upon a selective operation of said member, for arresting operation of the machine after registration of the quotient digit being registered has been completed, and means controlled by said member, upon a variant selective operation thereof, for arresting operation of said actuating mechanism at the conclusion of the current cycle of operation of said driving mechanism.

4. In a calculating machine having numeral wheels, settable actuating mechanism, and means for effecting operation of said numeral wheels by said actuating mechanism including cyclic driving means for said actuating mechanism; the combination with means for controlling said machine to automatically divide an amount set up in said numeral wheels by an amount set up in said actuating mechanism and to register a plural digit quotient including means manually operable to initiate the operation, and means for holding elements of said manually operable means in operative position; of division interrupting controls comprising a manually operable member, means jointly controlled by said division controlling means and said member, upon a selective operation of said member, for releasing said elements from operative position to arrest operation of the machine after registration of the quotient digit being registered has been completed, and means controlled by said member, upon a variant selective operation thereof, for arresting operation of said actuating mechanism at the conclusion of the current cycle of operation of said driving mechanism.

5. In a motor driven calculating machine having actuating mechanism and control means therefor comprising means for initiating operation of the actuating mechanism by the motor and means, including a spring energized element and latch means for restraining the same, for arresting operation of said actuating mechanism; an actuating device for said arresting means comprising a member selectively movable along different paths, spring means normally effective to direct said member into a path in which it will trip said latch means, a deflector effective upon movement of said member to deflect it into a path in which it will not trip said latch means, and means actuated by said member upon movement thereof for removing said deflector from effective position; whereby upon repeated movement thereof said member will trip said latch means.

6. In a motor driven calculating machine having actuating mechanism and control means therefor comprising means for initiating operation of the actuating mechanism by the motor and means, including a spring energized element and latch means for restraining the same, for arresting operation of said actuating mechanism; an actuating device for said arresting means comprising a member selectively movable along different paths, guide means effective after initial movement of said member for preventing movement thereof from one to another of said paths, spring means normally effective to direct said member into a path in which it will trip said latch means, a deflector effective during initial movement of said member to deflect it into a path in which it will not trip said latch means, and means actuated by said member during movement thereof under the influence of said guide means for removing said deflector from effective position; whereby upon repeated movement thereof said member will trip said latch means.

7. In a motor driven calculating machine having actuating mechanism and control means therefor comprising means for initiating operation of the actuating mechanism by the motor, division control means including a releasable device for preventing interruption of the sequential operations incident to division computations at predetermined stages thereof; and means, including a spring energized element and latch means for restraining the same, for arresting operation of the actuating mechanism at any stage of a division computation; a control mechanism comprising a member selectively movable along different paths, spring means normally effective to direct said member into a path in which it will trip said latch means, a deflector effective upon movement of said member to deflect it into a path in which it will release said releasable device but will not trip said latch means, and means actuated by said member upon movement thereof for removing said deflector from effective position; whereby upon repeated movement thereof said member will trip said latch means.

8. In a motor driven calculating machine having actuating mechanism and control means therefor comprising means for initiating operation of the actuating mechanism by the motor, division control means including a releasable device for preventing interruption of the sequential operations incident to division computations at predetermined stages thereof; and means, including a spring energized element and latch means for restraining the same, for arresting operation of the actuating mechanism at any stage of a division computation; a control mechanism comprising a member selectively movable along different paths, guide means effective after initial movement of said member for preventing movement thereof from one to another of said paths, spring means normally effective to direct said member into a path in which it will trip said latch means, a deflector effective during initial movement of said member to deflect it into a path in which it will release said releasable device but will not trip said latch means, and means actuated by said member during movement thereof under the influence of said guide means for removing said deflector from effective position; whereby upon repeated movement thereof said member will trip said latch means.

9. In a cyclically operable calculating machine a plurality of mechanisms settable to maintain the machine in operation, means for setting said mechanisms, means for holding said mechanisms in set position, a depressible key, means operated by said key upon a single depression thereof for releasing one of said mechanisms from said holding means, means responsive to operation of said setting means for automatically releasing another of said mechanisms from said holding means, and means operated by the aforesaid key upon a second depression thereof for releasing said last mentioned mechanism from said holding means.

10. In a cyclically operable calculating machine, means settable to maintain the machine in operation, means for setting said settable means, a plurality of devices for holding said settable means in set position, a depressible key, means operated by said key upon a single depression thereof for releasing said settable means from one of said holding devices, means responsive to operation of said setting means for automatically releasing said settable means from another of said holding devices, and means operated by the aforesaid key upon a second depression thereof for releasing said settable means from said last mentioned holding device.

11. In a cyclically operable calculating machine a plurality of mechanisms settable to maintain the machine in operation, means for setting said mechanisms, means for holding said mechanisms in set position, means responsive to operation of said setting means for automatically releasing one of said mechanisms from said holding means, a manually depressible key, a member actuated by said key upon a single depression thereof for releasing another of said mechanisms from said holding means, and means controlled by said last mentioned mechanism and automatically rendered effective upon release thereof for conditioning said member to release the other of said mechanisms from said holding means upon a second depression of said key.

12. In a motor driven calculating machine having reversibly operable registering mechanism, settable actuating mechanism, and means for controlling said actuating mechanism to divide an amount registered by said registering mechanism by an amount set into said actuating mechanism and to register a quotient, including a member operable to initiate such operation and means actuated by power derived from the motor for causing said actuating mechanism to be driven by power derived from said motor; the combination of means controlled by said division initiating member for rendering said power actuated means effective to cause said actuating mechanism to be driven, spring means for rendering said power actuated means ineffective, a latch for preventing operation of said spring means, a division interrupting member movable to effective position at any stage of a division operation, and means controlled by said division interrupting member upon two successive movements thereof to said effective position for releasing said latch to permit operation of said spring means.

13. In a cyclically operable calculating machine, the combination with a plurality of mechanisms settable to maintain the machine in operation and means for holding said mechanisms in set position; of a releasing member movable along one path to release one of said mechanisms from said holding means and movable along another path to release another of said mechanisms from said holding means, spring means normally effective to direct said member into said one of said paths, a deflector, means normally positioning said deflector to deflect said member into said other path upon movement of said member, and means actuated by said member upon movement thereof for removing said deflector from said deflecting position; whereby upon repeated move- 14. In a cyclically operable calculating machine, the combination with a plurality of mechanisms settable to maintain the machine in operation, and means for holding said mechanisms in set position; of a releasing member movable along one path to release one of said mechanisms from said holding means and movable along another path to release another of said mechanisms from said holding means, guide means effective after initial movement of said member for preventing movement thereof from one to another of said paths, spring means normally effective to direct said member into said one of said paths, a deflector, means normally positioning said deflector to deflect said member into said other path upon movement of said member, and means actuated by said member during movement thereof under the influence of said guide means for removing said deflector from said deflecting position; whereby upon repeated movement thereof said member will follow the path into which it is directed by said spring means.

15. In a cyclically operable calculating machine mechanism settable to maintain the machine in operation, a plurality of means for holding said mechanism in set position, a releasing member movable along one path to release said mechanism from one of said holding means and movable along another path to release said mechanism from another of said holding means, guide means normally effective to direct said member into said one of said paths, means responsive to said member upon movement thereof along said one of said paths for setting said guide means to direct said member into said other of said paths upon a second movement thereof; whereby upon repeated movement thereof said member will release said mechanism from said two mentioned holding means seriatim.

16. In a calculating machine, the combination with a plurality of mechanisms settable to maintain the machine in operation, means for setting said mechanisms including a manipulable member settable to initiate operation of the machine, and means for holding said mechanisms in set position; of a releasing member movable along one path to release one of said mechanisms from said holding means and movable along another path to release another of said mechanisms from said holding means, spring means normally effective to direct said releasing member into said one of said paths, a deflector, means operable upon setting of said manipulable member to position said deflector to deflect said releasing member into said other path upon movement of said releasing member, means actuated by said releasing member upon movement thereof for removing said deflector from said deflecting position; whereby upon repeated movement thereof said releasing member will follow the path into which it is directed by said spring means, and means responsive to said two mentioned mechanisms upon release thereof from said holding means for directing said member into said other path.

HAROLD T. AVERY.